US008856256B1

(12) United States Patent
Srinivasan

(10) Patent No.: US 8,856,256 B1
(45) Date of Patent: Oct. 7, 2014

(54) SYSTEM AND METHOD FOR FILE SHARING AND UPDATING

(71) Applicant: CoralTree Inc., Cupertino, CA (US)

(72) Inventor: Tiruvali S Srinivasan, Cupertino, CA (US)

(73) Assignee: CoralTree Inc., Cupertino, CA (US)

( * ) Notice: Subject to any disclaimer, the term of this patent is extended or adjusted under 35 U.S.C. 154(b) by 0 days.

(21) Appl. No.: 14/209,428

(22) Filed: Mar. 13, 2014

Related U.S. Application Data

(60) Provisional application No. 61/779,298, filed on Mar. 13, 2013.

(51) Int. Cl.
G06F 15/16 (2006.01)
G06F 17/30 (2006.01)
H04L 29/06 (2006.01)
(52) U.S. Cl.
CPC .......... *G06F 17/30011* (2013.01); *H04L 67/42* (2013.01)
USPC .......................................... 709/206; 709/207
(58) Field of Classification Search
USPC .................. 709/203, 206–207, 223–229, 250
See application file for complete search history.

(56) References Cited

U.S. PATENT DOCUMENTS

| 8,326,814 | B2 | 12/2012 | Ghods et al. | |
| 8,447,825 | B2 | 5/2013 | Aono | |
| 8,458,281 | B2 | 6/2013 | Kamijima et al. | |
| 8,484,178 | B1 | 7/2013 | Bidchandani et al. | |
| 2011/0276881 | A1* | 11/2011 | Keng et al. | 715/723 |
| 2012/0239618 | A1 | 9/2012 | Kung | |
| 2012/0311010 | A1 | 12/2012 | Shah | |
| 2013/0031155 | A1 | 1/2013 | Terrano et al. | |
| 2013/0041918 | A1 | 2/2013 | Landais | |
| 2013/0151850 | A1* | 6/2013 | Bugenhagen | 713/165 |
| 2013/0275398 | A1* | 10/2013 | Dorman et al. | 707/693 |
| 2014/0026182 | A1* | 1/2014 | Pearl et al. | 726/1 |

* cited by examiner

*Primary Examiner* — Zarni Maung
(74) *Attorney, Agent, or Firm* — Courtney IP Law; Barbara B. Courtney

(57) ABSTRACT

Embodiments of the present invention include a method and system for sharing changes made by an application to a file on one computer, coherently with other computers, over the Internet. If the application changes multiple files (also referred to as a file group), changes made to all the files are shared together coherently with other computers over the Internet. Coherence over multiple file copies and file group copies is maintained whether users work on files online or offline. A 'File Upload Lock' is maintained on a Cloud Server for ensuring coherent sharing of changes made to files. Embodiments include two file syncing processes, variously described as 'Incremental File Upload' or 'Incremental File Download' and 'Delta File Upload' or 'Delta File Download'. Embodiments also encompass an 'Explorer' software tool and user interface that displays folders and files on user devices with pertinent details from the device and the Cloud Server.

23 Claims, 27 Drawing Sheets

1008

SYSTEM AND METHOD FOR FILE SHARING AND UPDATING

RELATED APPLICATIONS

This application claims the benefit of U.S. Provisional Patent Application No. 61/779,298, filed Mar. 13, 2013, which is incorporated by reference in its entirety herein.

FIELD OF INVENTION

Embodiments are in the field of collaborative electronic file sharing among multiple computers over the Internet, and keeping changes to different copies of the same file updated coherently and systematically.

BACKGROUND

Technologies for sharing electronic files among multiple Computers, and maintaining file coherency have existed for many years. In general these technologies fall into one of the following categories:

1. Methods for sharing files between Computers in a 'Client/Server' configuration, connected over a Local Area Network or a Wide Area Network, have been implemented. These technologies allow Computers to share and update files resident on a Server or on individual Computers, by implementing file coherency protocols that store file status on individual Computers or on the Server. These technologies are not suitable for sharing files over the Internet, because of low bandwidth and high latency issues.
2. A method for sharing and modifying files between Computers connected to the Internet involves storing the files to be shared on a Central Server or a Shared Drive in the Cloud. An Application running on a Computer can access the file over the Internet and 'lock' the file or parts of the file (records) before making changes. This technology assures coherency but limits performance and flexibility for users due to the fact that Applications must continuously access the file over the Internet. When the bandwidth of the Internet is limited, the performance of the Application is affected, generally restricting the use of this technology. Moreover, users cannot work offline in this case, and must maintain continuous Internet connectivity when they work.
3. A method for sharing files that are resident on one Computer by creating identical copies on other Computers over the Internet has been implemented. In general such technologies function by uploading the file from one Computer over the Internet to a Server in the cloud and then downloading the file to the other Computers with whom the file is shared. When a user makes changes to the file, the changes are again uploaded over the Internet to the Server in the cloud and downloaded to the other Computers. Coherency issues arise when multiple users make changes to the same file simultaneously, on their respective Computers. Current technologies create conflicting copies of the same file on all Computers forcing the users to use only one copy of the file and discard others, resulting in wasted time and effort.
4. Yet another approach makes a user desirous of making changes 'Check Out' or 'Sync' a copy of the file from a central Server in the cloud to the local Computer. Other users cannot 'Check Out' or 'Sync' the file for making changes, But can access it in a 'Read only' mode, until the first user has 'Checked In' or does 'Sync'. This approach, while assuring file coherency, is mostly cumbersome and inflexible for the average user to implement in his or her daily work environment. If the Application creates and changes multiple data files that are associated with the main data file, then using this method for coherent file sharing becomes even more cumbersome to implement in a daily work environment.

DETAILED DESCRIPTION

Figure 1:
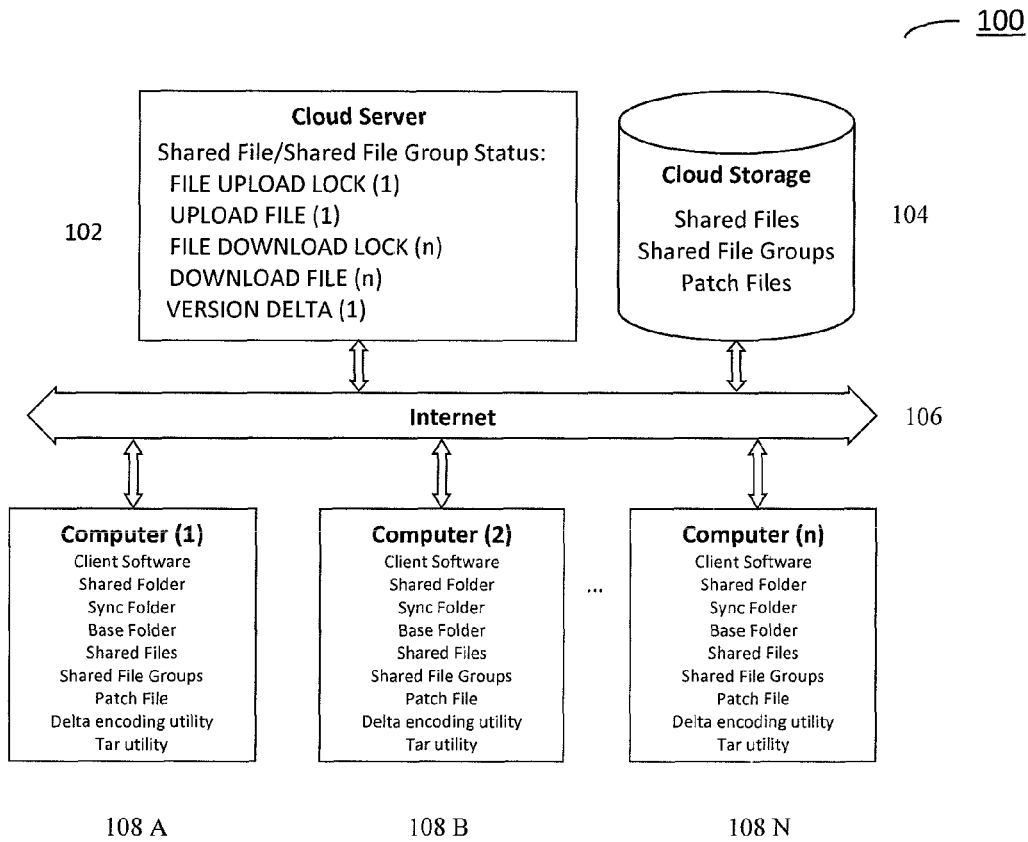
FIG. 1 is a block diagram of a file sharing system according to an embodiment.

Embodiments described include a method and system for sharing files which are resident on one computer, by creating identical copies of the files on other computers, over the Internet. For sharing, the files are first uploaded to a Cloud Storage over the Internet and then downloaded to the other computers. When an application makes changes to the Shared File on one computer, the changes are uploaded asynchronously to the Cloud Storage, then downloaded from the Cloud Storage and merged with the Shared Files on the other computers, thus making them identical to the source file. File coherency issues arise if more than one user attempts to make changes to the file simultaneously. The method and system described herein use an innovative 'File Locking' concept to ensure that shared files can be edited only by one user. The Cloud Server issues file lock only to one user at a time. Only edits made by the user with file lock are uploaded and shared with other users. Other users can simultaneously view the file, but their edits will not be uploaded, thus ensuring file coherency. This systematic method helps prevent data corruption while files are being shared by any number of users, who are geographically dispersed, allowing them to collaborate efficiently in real time. Applications running on all computers access identical copies of the Shared File from the computer's local storage, so they continue to perform at normal speeds without getting impaired by Internet bandwidth or availability. If the application creates and changes multiple files, then Cloud Server issues file lock for all the files together, so that changes made to all the files are uploaded and shared with other users coherently.

Embodiments describe two innovative methods for uploading and downloading files or changes made to files to/from the Cloud Server. The 'Incremental Upload' or 'Incremental Download' method involves dividing the file into multiple parts and uploading and downloading only the parts that are changed. The 'Delta Upload' or 'Delta Download' method involves concatenating all the files in the group using a 'TAR' utility, computing the differences between the current and previous concatenated files using a Delta encoding utility, and uploading or downloading only the 'Patch File' that contains differences, to or from the Cloud Storage.

Embodiments also describe the Explorer tool used to display folders and files that are being shared with other computers using the method and systems described. The Explorer tool displays information related to the folders and files from the computer's local storage, as well as their status from the Cloud Server, so users can get a consolidated view at one place, right on their computers, without the need for logging in to a Website.

The term "Computer" as used in this document includes any device capable of interacting with a user and performing data processing as required for commonly known user applications, such as word processing applications or accounting applications. Examples of user applications include MS Word™ (word processing software available from Microsoft) and QuickBooks™ (accounting software available from Intuit). The term "computer" also includes any such devices further capable of communicating over any network, whether wired or wireless.

The term "Shared File" as used in this document refers to a file which is shared among multiple computers.

The term "Shared File Group" as used in this document refers to a group of files used by an Application which are created, opened and changed concurrently.

In many cases, not all the files created by an Application are required for sharing data on other computers. As an example, temporary files or files that contain information specific to the configuration of a computer are not required to be shared with other Computers. The Shared File Group is configured to include only those files that are required by the Application for sharing, thus helping to preserve storage space and Internet bandwidth used for upload and download.

For sharing, files are uploaded from one Computer to a Cloud Storage over the Internet and then downloaded to the other Computers sharing the file. When a user opens a Shared File on his or her Computer to make changes, a 'File Upload Lock' is issued to the user. Only the changes made to a Shared File by a user with File Upload Lock are uploaded to the Cloud Storage and downloaded to other Computers sharing the file. Other users opening the Shared File on their Computers simultaneously will be denied the File Upload Lock and changes made by them will not be uploaded, ensuring coherent updates. Conceptually File Upload Lock determines which user can modify a file at any time. File Upload Lock can also be thought of in software programming terms as a flag that is set or reset depending on current conditions, as described later in this document. Other terms herein that denote concepts (such as the status of electronic files), conditions and flags are: File Download Lock, Download File, and Upload File.

File Upload Lock is issued as soon as a user opens a Shared File on his or her Computer, using its supported Application. Changes made to the file are then uploaded as soon as the user closes the Shared File. This helps users acquire the File Upload Lock and share changes made to the Shared File during their familiar file opening and closing operation, without a need performing any special tasks.

If the Application uses multiple files, File Upload Lock is issued for the Shared File Group simultaneously when one or more of the files in the Shared File Group are opened using the Application. This ensures that changes made to all the files used by the Application are updated coherently to the other Computers sharing the files. Thus the methods and systems described supports a wide variety of Software Applications helping users in several industry segments collaborate efficiently.

Files, or changes made to files are uploaded to or downloaded from the Cloud Storage according to various embodiments. Two different methods for uploading and downloading described in this document: The Incremental Upload or Incremental Download method divides the file into several parts and uploads or downloads only the parts that are changed. Thus only changes are stored in the Cloud Server, preserving storage space and bandwidth of Internet connections.

The Delta Upload or Delta Download method computes the differences between previous and current versions of the file using a Delta encoding utility and stores only the 'Patch File' that contains the differences. The Delta method offers fast uploads and downloads as the Patch File is usually very small. Typically, the Delta Upload or Download method requires higher capacity Cloud Servers.

Applications running on each Computer sharing the file access identical copies of the Shared Files or Shared File Groups from the Computer's local storage, so they continue to perform at normal speeds without being negatively affected by Internet bandwidth or availability issues. Optionally, a user can obtain a File Upload Lock while connected to the Internet and online, then go offline and continue to work on the file. Changes are uploaded to the Cloud Storage when the user gets back online.

To share a file, a user first sets up the file in the 'Shared Folder' on his or her Computer. Client Software running on the Computer uploads the file over the Internet to the Cloud Storage. Client Software running on the other Computers sharing the file then download the file over the Internet from the Cloud Storage to the Shared Folders on each Computer. Now all the Computers have identical copies of the Shared File.

If the Application uses multiple files, then the user sets up all the files in the Shared Folder, usually by means of a backup/restore operation supported by the Application. Client Software identifies and uploads all the files used by the Application, or the Shared File Group, to the Cloud Storage, which are then downloaded to the Shared Folders on the other Computers sharing the file. Client Software is configured to support several Applications and their file types, which can be single or multiple files.

When a user opens the Shared File on his or her Computer using its supported Application, Client Software prompts the user to confirm if he or she intends to make changes to the Shared File and wants File Upload Lock for the file. If the user confirms that he or she wants File Upload Lock, Client Software communicates over the Internet with the Cloud Server and acquires the File Upload Lock for the Shared File. The user can then make changes to the Shared File. Once the changes are completed and the file is closed, Client Software uploads the changes to the Cloud Storage, creating a new version of the Shared File, and the File Upload Lock is released. Client Software running on the other Computers sharing the file are instructed by the Cloud Server to download the changes made to the Shared File when they do a periodic HANDSHAKE with the Cloud Server. The changes are then downloaded and merged with the copies of the Shared File on each Computer, making them identical.

If the Application opens multiple files, then Cloud Server issues the above mentioned File Upload Lock for the Shared File Group. When the user closes the file, changes made to all the files in the Shared File Group are uploaded together to the Cloud Storage and downloaded together to each Computer sharing the files.

During the time the first user has the File Upload Lock, if one or more of the other users open the Shared File on their Computers and try to acquire the File Upload Lock, Cloud Server will decline the File Upload Lock, as it is already issued to the first user. Any changes to the Shared File made by the other users will not be uploaded to the Cloud Storage thus assuring coherent updates.

Methods and systems described offer complete flexibility to users for efficient collaboration in real time, including the ability to just view the files even if another user has acquired the File Upload Lock, ability to lock and work on the files while they are being uploaded or downloaded, preservation of file status to ensure resumption of operation in case of system shut down at any point and recovery of files from the Cloud Storage in case of a system crash.

Method and systems described use two different methods to upload or download files from/to Computers to/from the Cloud Storage.

Incremental method splits the file into parts of fixed size. When the file is uploaded for the first time, all the parts are uploaded to the Cloud Storage and downloaded from the Cloud Storage to the other Computers sharing the file. During the upload process, Client Software sends the Sequence Number and Checksum of each part to the Cloud Server.

To upload changes made to the file, Client Software sends the Sequence Numbers and Checksum of all the parts of the modified file to the Cloud Server. Cloud Server compares these with the previously stored information and instructs the Client Software to upload only the parts who's Checksums have changed or the parts which have been added.

Client Software running on other computers first send the Sequence Numbers and Checksum of the file already present on the computer and the Cloud Server instructs them to download only the parts who's Checksum has changed, download parts who's Sequence Numbers are not present, and delete parts who's Sequence Numbers have been removed.

The Incremental method thus uploads or downloads only changed parts of the Shared File or the files in the Shared File Group.

The second method uses 'Delta encoding' to generate the difference between a previous version and the current version of the file, which is then stored as a 'Patch' file. Only the Patch file is uploaded to the Cloud Storage. Other computers sharing the file download the Patch file from the Cloud Storage and use Delta encoding to apply the Patch file to the previous version of the file to generate the current version. Patch files are usually small so this method offers extremely fast uploads and downloads. This option is provided to users who have very large files that need to be modified and shared for real time collaboration.

File sharing using the Delta encoding method involves first uploading the complete file to the Cloud Storage and then downloading the file to other computers sharing the file. Each computer stores this file as the 'Base File' which is then used to compute the Patch file or apply the Patch file. Changes made to the file on one computer are shared with other computers by first generating the 'Patch' file on the computer uploading the file, which is then uploaded to the Cloud Storage. The 'Patch' file is downloaded to the other computers, where it is applied to the Base File to generate the current version of the file. As further described below, the Base File used for generating or applying the Patch file is updated periodically on all the computers as well as the Cloud Server. This keeps the Patch file size relatively small, which in turn keeps upload and download times relatively short.

System and Method Embodiments

FIG. 1 is a block diagram of a file sharing and updating system 100 according to an embodiment. Various components are shown as well as file status involved in the various methods described further herein.

Cloud Server shown at 102 is a Computer Server running dedicated software, accessed over the Internet, maintaining Status, Parts, Checksum and Version information of each Shared File or Shared File Group for all the Computers sharing the file. Cloud server 102 includes one or more central processing units and sufficient local data storage devices. Although cloud server 102 is shown as a single, discrete element, embodiments include distributed processing with multiple processors in different locations collaboratively running the dedicated software.

The Cloud Server maintains a set of status information for each Shared File or each Shared File Group as listed at 102:

a. FILE UPLOAD LOCK—one for each Shared File or each Shared File Group. FILE UPLOAD LOCK is SET to indicate that it has been issued to a Shared File or a Shared File Group on a Computer. FILE UPLOAD LOCK also indicates that changes made to the file have to be uploaded to the Cloud Server once the file is closed.

b. UPLOAD FILE—one for each Shared File or each Shared File Group. UPLOAD FILE is SET to indicate that changes made to a Shared File or Shared File Group on a Computer are ready to be uploaded from the Sync Folder to the Cloud Storage c. DOWNLOAD FILE—one for each Shared File or each Shared File Group, for each Computer. DOWNLOAD FILE is SET to indicate that changes made to the Shared File or the files in a Shared File Group are ready to be downloaded from the Cloud Storage to the Sync Folder on the Computer.

d. FILE DOWNLOAD LOCK—one for each Shared File or each Shared File Group, for each Computer. FILE DOWNLOAD LOCK is SET to indicate that the file has been downloaded to the Sync Folder and is ready to be copied to the Shared Folder on the Computer.

e. VERSION DELTA—in the Delta encoding method, this is the number of uploaded versions of the Shared File or concatenated Shared File Group after which the Base File in the Base Folder is replaced with the current version of the Shared File or the concatenated Shared File Group.

Cloud Storage shown at 104 is a mass storage service accessed over the Internet where Shared Files and Shared File Groups are stored. Cloud storage 104 is shown as one element, but it is just as commonly distributed over the internet in the known manner.

Communication between Client Software and Cloud Server uses the Internet 106 to exchange various information including:

a. Periodic HANDSHAKE to exchange Shared File Status and other information b. To acquire File Upload Lock
c. To initiate upload of Shared Files or changes made to Shared Files
d. To initiate download of Shared Files or changes made to Shared Files Computers shown at 108A, 108B, etc. utilize the Method and Systems described in this embodiment to share files or groups of files that are resident on their local storage. These computers have the components described below:

Client Software—Dedicated software program installed and running on each Computer sharing the file.

Shared Folder—folder created on each Computer by the Client Software running on that Computer. Shared Files or files in a Shared File Group are setup in the Shared Folder Sync Folder—folder created on each Computer by the Client Software running on that Computer:
a. During upload operation, Shared Files or files in the Shared File Groups or concatenated Shared File Groups are copied from the Shared Folder to the Sync Folder, and then uploaded to the Cloud Storage from the Sync Folder.
b. During download operation, Shared Files or files in the Shared File Groups or concatenated Shared File Groups are downloaded from the Cloud Storage to the Sync Folder, and then copied to the Shared Folder Base Folder—created by the Client Software on each computer that uses Delta encoding method, and contains the Base File used to generate the Patch File or for applying Patch File.

Patch File—created by the Delta encoding method; contains the differences between the Shared File or concatenated Shared File Group in the Sync Folder and the Base File in the Base Folder.

Delta encoding utility—this is an open source software commonly used for computing differences between files to generate a patch file, or for applying the patch file to a base file to generate the current version of the file.

TAR utility—this is an open source software commonly used for concatenating files into a single file for archival purposes, or for generating individual files from a single concatenated file.

Figure 2:
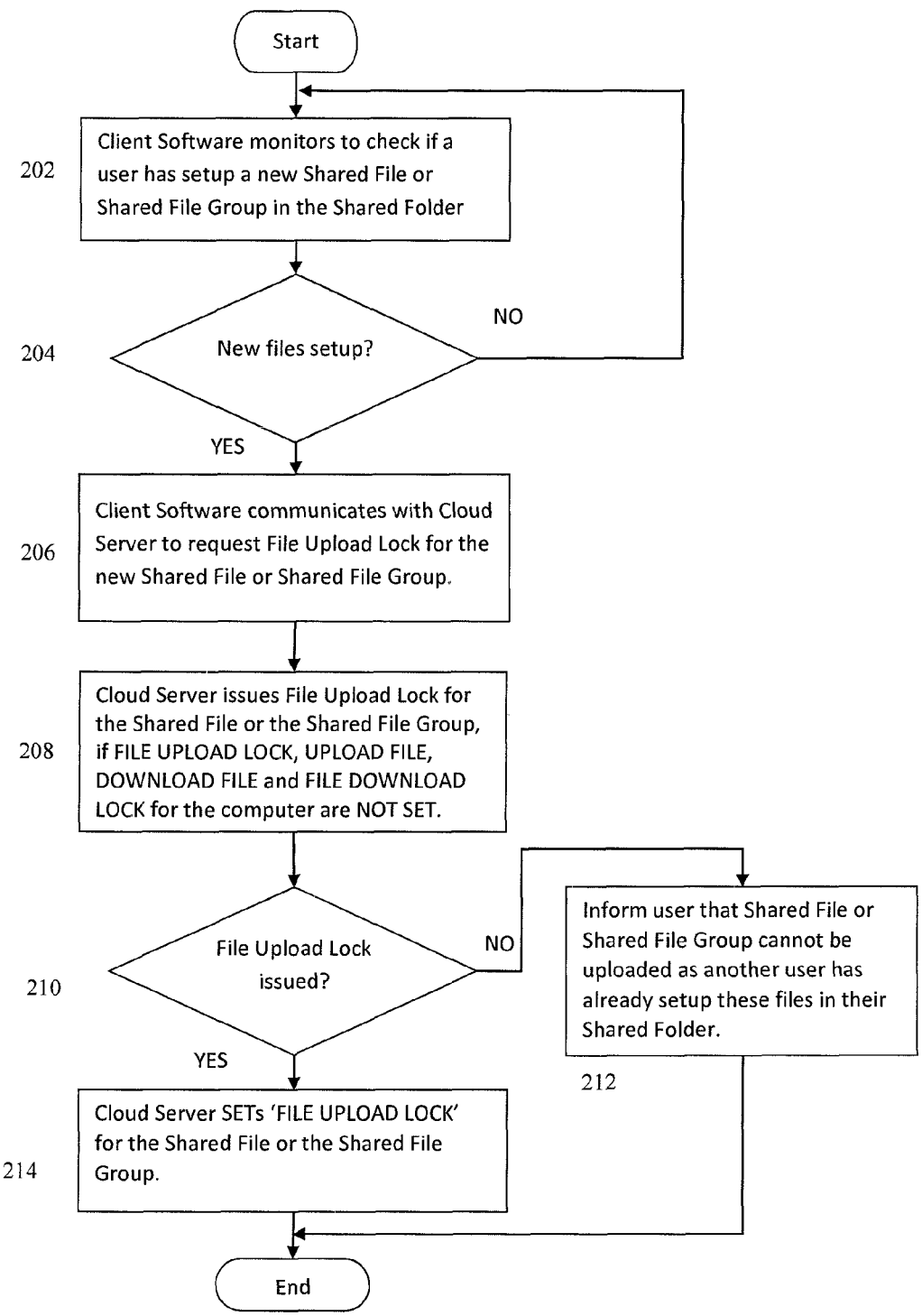
FIG. 2 is a flow diagram illustrating a 'File Upload Lock' process for a new file according to an embodiment.

FIG. 2 is a flow diagram illustrating a 'File Upload Lock' process 200 according to an embodiment. This is a process used to issue File Upload Lock to a new file or group of new files setup by the user in the Shared Folder.

Users first register on a web site provided and administered by an entity that supplies the system and method described herein. As an example, the user registers on the Corallree™ website, after which the Client Software is installed on their Computers, which then creates the Shared Folder and the Sync Folder. Once installed, Client Software running on each Computer starts communicating with the Cloud Server over the Internet, doing a periodic 'HANDSHAKE' every few seconds. During this HANDSHAKE, file status information is exchanged between the Client Software and Cloud Server. Cloud Server maintains Status of each Shared File or Shared File Group and for each Computer sharing the file.

A user sets up files to be shared in the Shared Folder on his or her Computer. If the supported Application creates and modifies multiple files then the user sets up all the files in this Shared File Group in the Shared Folder. The user can do this setup usually by first backing up the files in the Application and then restoring them into the Shared Folder.

When the new files are setup, Client Software, which monitors the Shared Folder at 202, detects that new files have been added at 204 and communicates with the Cloud Server at 206 to request for FILE UPLOAD LOCK for the new files.

At 208, Cloud Server checks if the status of 'FILE UPLOAD LOCK' and 'UPLOAD FILE' for the file, as well as the status of 'DOWNLOAD FILE' OR 'FILE DOWNLOAD LOCK' for the Computer making the request. This condition can exist if another user has simultaneously setup the same file on another computer.

At 210, if none of these status for the file is SET, then at 214 Cloud Server issues 'FILE UPLOAD LOCK' to the Client Software and also changes the status of FILE UPLOAD LOCK maintained in the Cloud Server to SET.

If at 210 Cloud Server finds that any of the above mentioned status for the file is SET, it means that the same file has been setup in the Shared Folder on another Computer and the Cloud Server declines FILE UPLOAD LOCK for the file. The Client Software at 212 informs the user that the file cannot be uploaded due to a conflict.

Once the FILE UPLOAD LOCK for the file or the group of files in the Shared Folder is issued, another process 400 described in FIG. 4 uploads the files to the Cloud Storage.

Figure 3A:
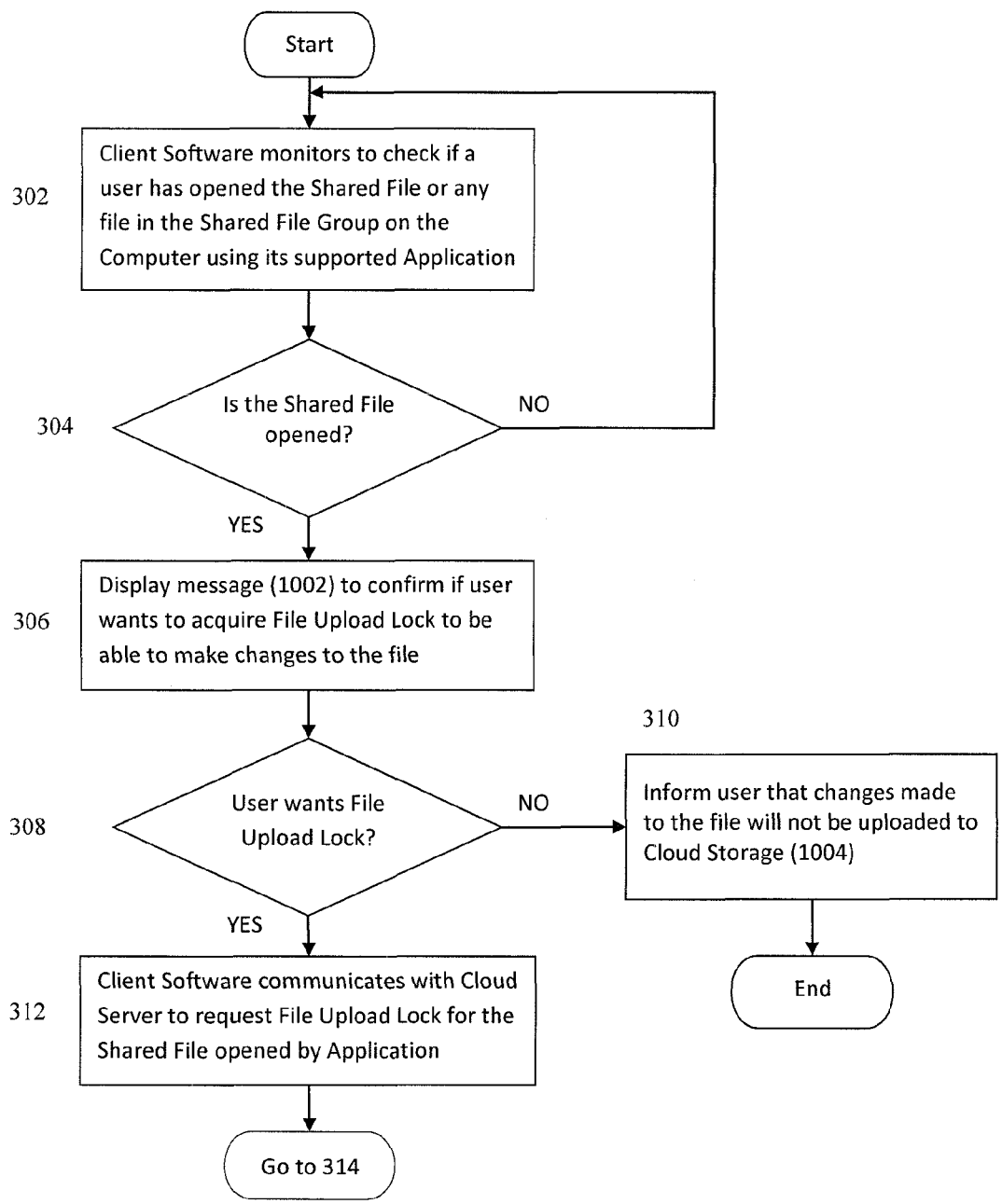
FIG. 3A and FIG. 3B are flow diagrams illustrating a process used to issue 'File Upload Lock' to an existing file according to an embodiment.
Figure 3B:
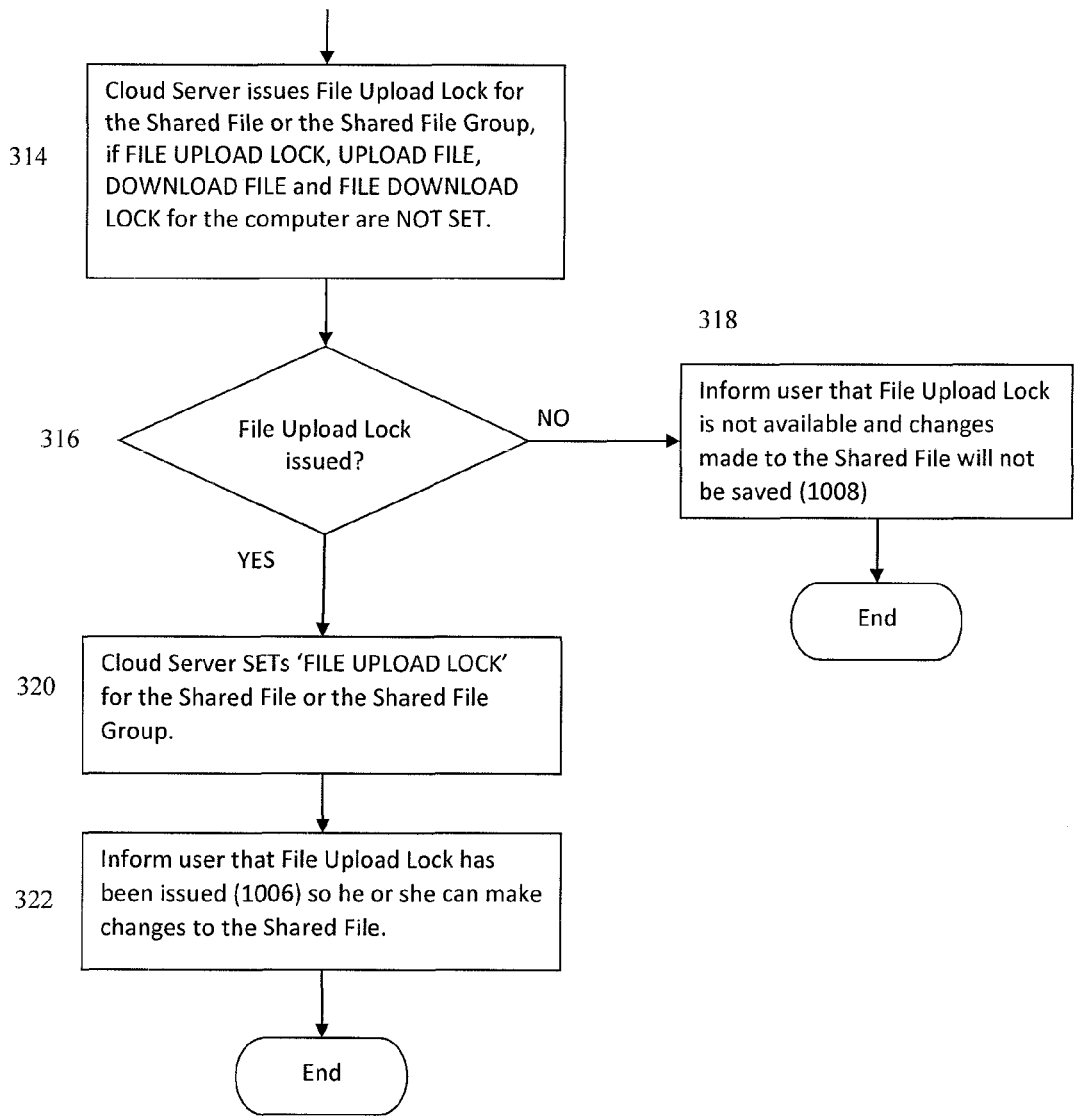

FIG. 3A and FIG. 3B are flow diagrams illustrating a process 300 used to issue 'File Upload Lock' to an existing file according to an embodiment. 'File Upload Lock' is issued to an existing file or group of files in the Shared Folder when a user opens the file to make changes.

When a user on a Computer opens the Shared File or one or more files in a Shared File Group, using its supported Application software, Client Software monitoring the Shared Folder at 302 detects the operation using any of the following methods depending on technology supported by the Operating System on the Computer and technology used by the Application to open the file:

a. If the supported Application 'opens' the file, Client Software detects the file open condition.
b. If the supported Application does a 'write' operation to the file while opening, Client Software detects the write operation.
c. If the supported Application creates temporary files while opening the file, Client Software detects the creation of temporary files with specific file types configured for such detection.

Figure 10A:
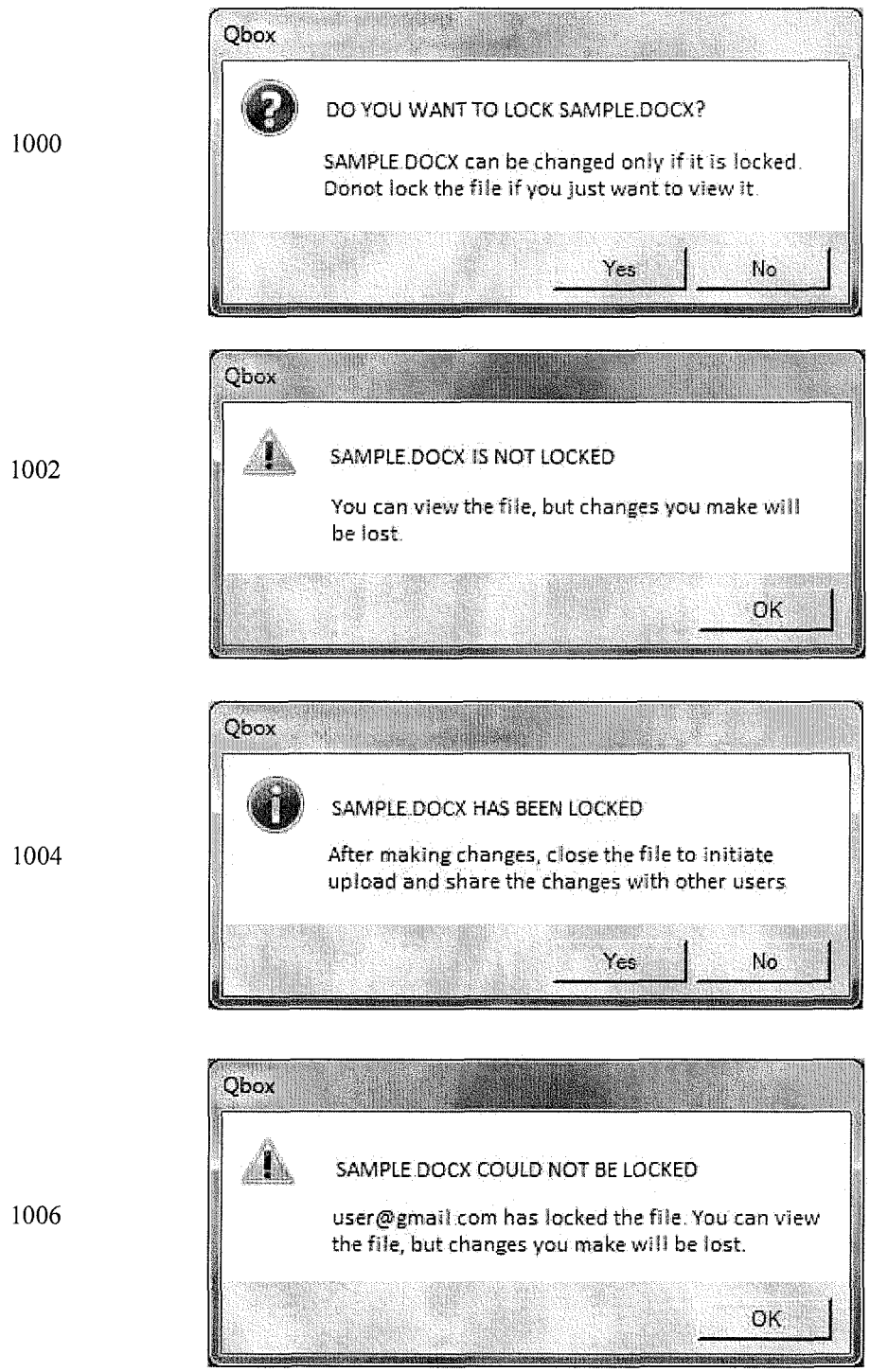
FIG. 10A and FIG. 10B are screenshots showing information to users during various operations of the system according to an embodiment.

At 304, when the Client Software detects that the supported Application has opened the Shared File or files in a Shared File Group, at 306 it displays a message (as shown in FIG. 10A at 1000) to confirm whether the user intends to make changes to the file and wants to acquire File Upload Lock.

At 308, if the user does not want File Upload Lock, Client Software displays a message (as shown in FIG. 10A at 1002) at 310 to inform user that changes made to the file will not be uploaded to the Cloud Storage.

At 308, if the user wants File Upload Lock, at 312 Client Software communicates with the Cloud Server to request File Upload Lock for the Shared File or the Shared File Group which has been opened by the user.

Cloud Server checks the status of the Shared File or the Shared File Group at 314 and issue File Upload Lock only if:
a. 'FILE UPLOAD LOCK' for the Shared File or Shared File Group is NOT already SET indicating that it has not been issued to another Computer;
b. 'UPLOAD FILE' for the Shared File or Shared File Group is NOT SET indicating that no upload of changes has been initiated from any Computer; and
c. 'DOWNLOAD FILE' for the Shared File or Shared File Group for the Computer requesting File Upload Lock is NOT SET indicating that no download of changes are pending for the Computer requesting the File Upload Lock.

d. 'FILE DOWNLOAD LOCK' for the Shared File or Shared File Group for the Computer requesting File Upload Lock is NOT SET indicating that no copying of downloaded file from the Sync Folder to the Shared Folder is pending for the Computer requesting the File Upload Lock.

At 316, if the Cloud Server declines to issue the File Upload Lock, Client Software at 318 displays a message (as shown in FIG. 10A at 1006) to inform and alert the user that the file could not be locked and any changes made to the file will not be uploaded. In this case, the user can view the file without making any changes.

At 316, if the Cloud Server issues the File Upload Lock, it SETs FILE UPLOAD LOCK for the Shared File or Shared File Group and informs Client Software that FILE UPLOAD LOCK has been issued. Client Software at 322 displays a message (as shown in FIG. 10A at 1004) to inform the user that FILE UPLOAD LOCK has been issued.

The user can now make changes to the Shared File or the Shared File Group in its supported Application. When the user is done with the changes and closes the file, changes made to the file are uploaded as described below.

Figure 4A:
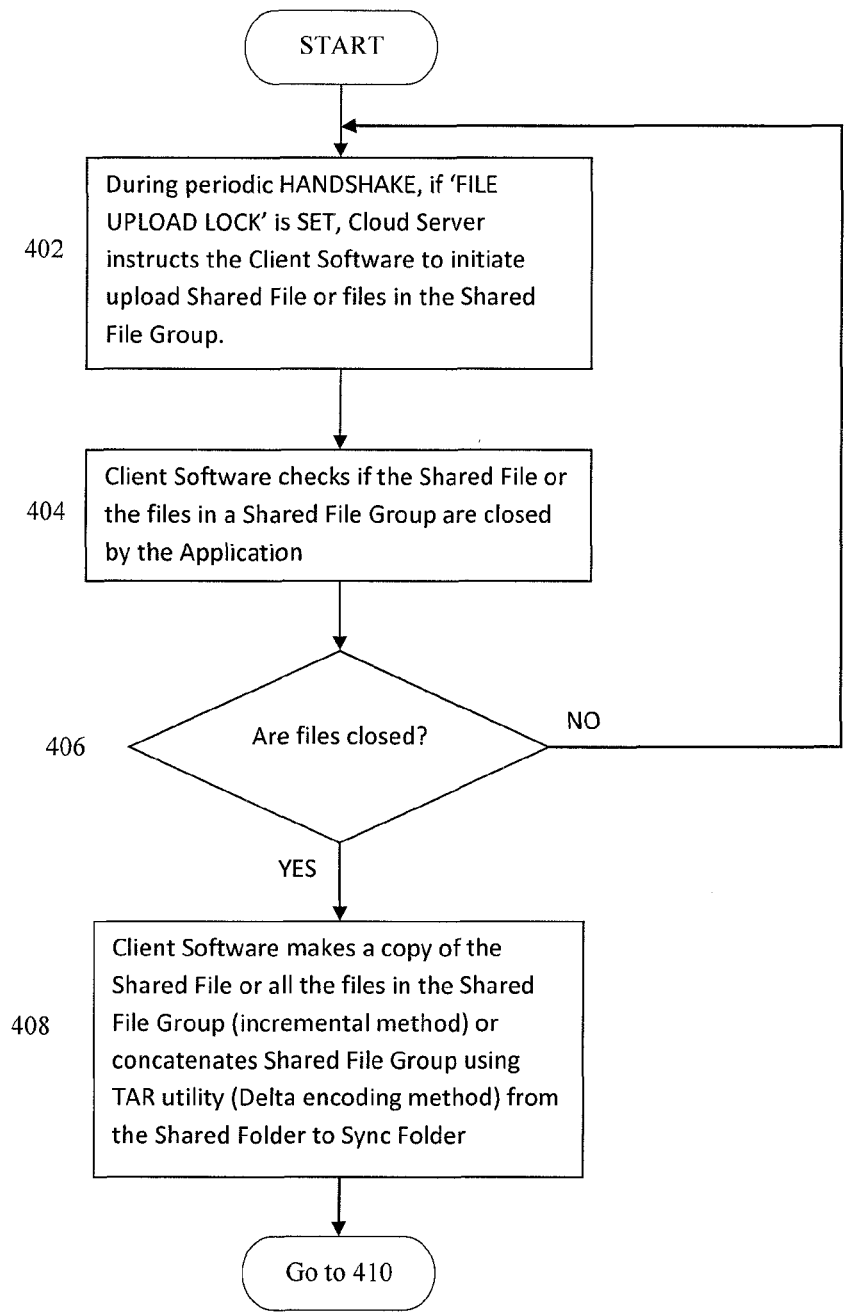
FIG. 4A, FIG. 4B, and FIG. 4C are flow diagrams illustrating a process used to upload a new file or changes made to an existing file to the Cloud Storage according to an embodiment.
Figure 4B:
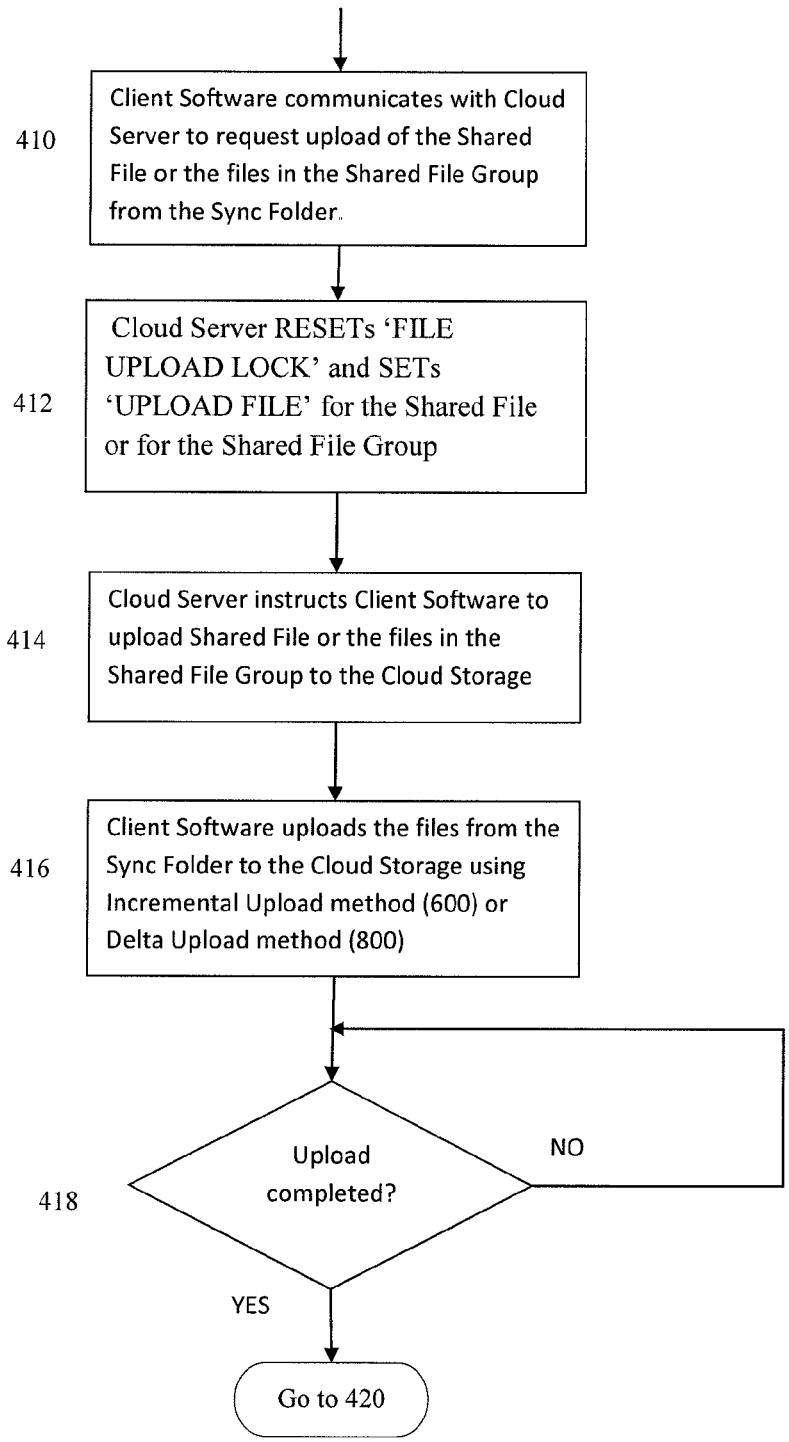
Figure 4C:
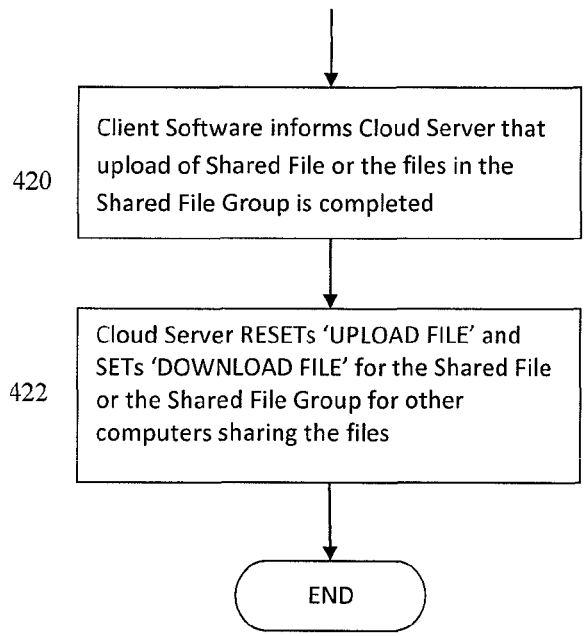

FIG. 4A, FIG. 4B, and FIG. 4C are flow diagrams illustrating a process 400 used to upload a new file or changes made to a Shared File or the files in the Shared File Group to the Cloud Storage.

When the Client Software communicates with the Cloud Server to do a periodic HANDSHAKE, at 402, if the FILE UPLOAD LOCK for a Shared File or a Shared File Group in the Computer's Shared Folder is SET, Cloud Server instructs the Client Software to initiate upload of the Shared File or files in the Shared File Group.

Client Software at 404 checks if the Shared File or the Shared File Group are closed by the supported Application. Client Software detects the file closed condition using technology supported by the Computer Operating System.

At 406, if the files are open, no action is taken, until the next periodic HANDSHAKE, when the Cloud Server again instructs the Client Software to initiate upload the files. This continues until the Client Software detects that the file is closed.

At 406 if the files are closed, Client Software at 408 copies the Shared File or all the files in the Shared File Group, from the Shared Folder to the Sync Folder. In the case of Delta Upload method, Client Software uses the TAR utility to concatenate the files in the Shared File Group before copying them to the Sync Folder.

Client Software then communicates with the Cloud Server at 410 to request upload of the Shared File or the Shared File Group to the Cloud Storage.

At 412 Cloud Server RESETs FILE UPLOAD LOCK and SETs UPLOAD FILE for the Shared File or Shared File Group, indicating that the Shared File or the Shared File Group are ready to be uploaded from Sync Folder.

Cloud Server at 414 instructs the Client Software to upload the Shared File or the files in the Shared File Group from the Sync Folder to Cloud Storage.

Client Software at 416 then uploads the files from the Sync Folder to the Cloud Storage. For uploading Client Software uses either the Incremental Upload method described with reference to FIGS. 6A, 6B, and 6C, or the Delta Upload method described with reference to FIGS. 8A, 8B, 8C, and 8D, depending on the configuration available to the user.

While the files are being uploaded from the Sync Folder, the same user can open the Shared File or the Shared File Group again from the Shared Folder and acquire File Upload Lock to continue making changes, without waiting for the upload to be completed. This gives the users additional flexibility as the time taken to upload changes made to the file could be long if the Internet bandwidth available to the user is low.

At 418, when Client Software completes the upload of the Shared File or the files in the Shared File Group, it again communicates with the Cloud Server at 420 to inform that upload has been completed successfully.

The Cloud Server at 422 RESETs UPLOAD FILE and SETs DOWNLOAD FILE status for the Shared File or the Shared File Group for each Computer sharing the files, indicating that changes made by the user are now ready for download to the computers sharing the file.

Process 400 as described above is used to upload a new file or changes made to a file. The Incremental Upload method as described with reference to FIGS. 6A, 6B, and 6C or the Delta Upload method described with reference to FIGS. 8A, 8B, 8C, and 8D in turn implement different processes for uploading a new file or just the changes made to an existing file.

Figure 5A:
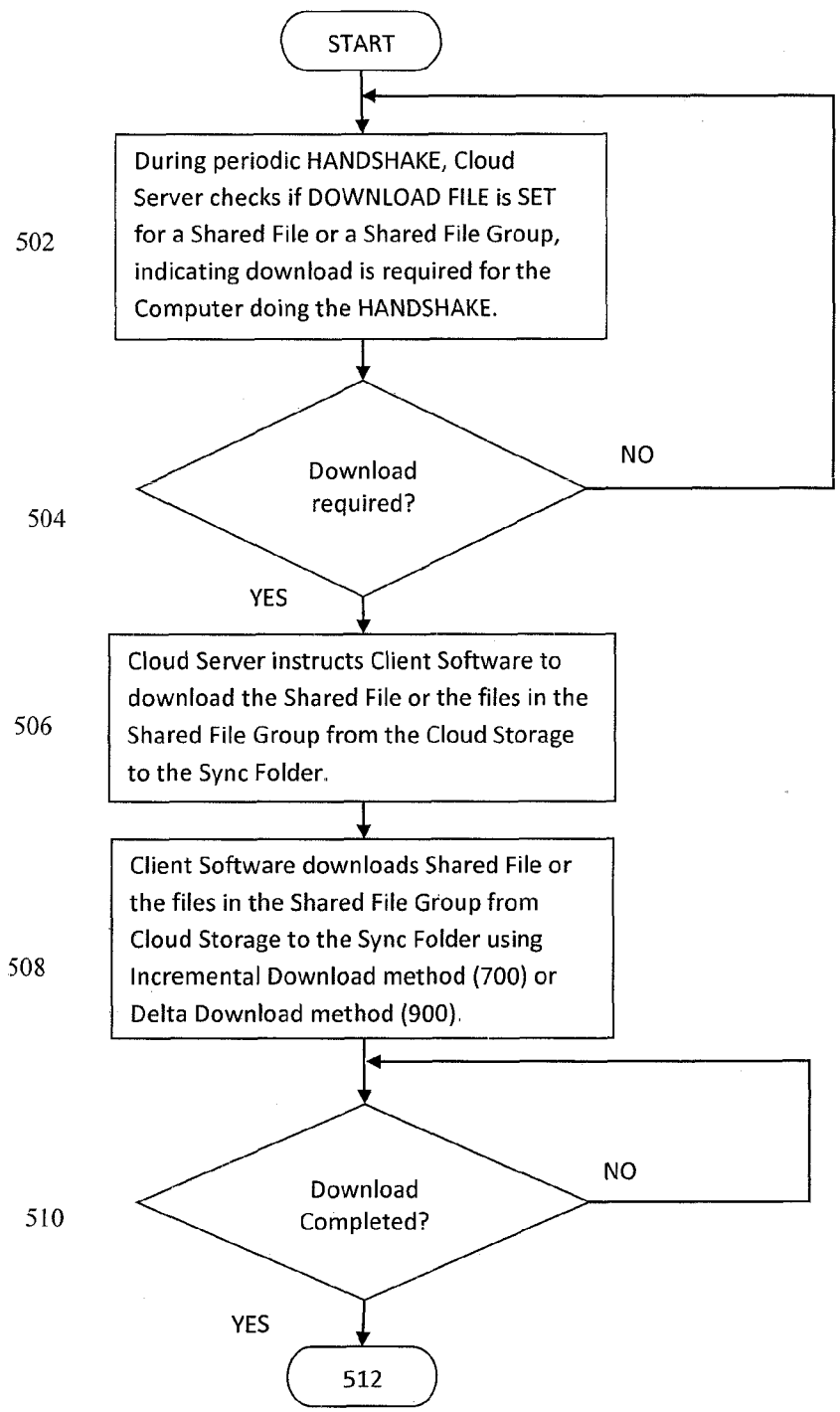
FIG. 5A, FIG. 5B, and FIG. 5C are flow diagrams illustrating a process used to download a new file or changes made to an existing file to other computers sharing the file according to an embodiment.
Figure 5B:
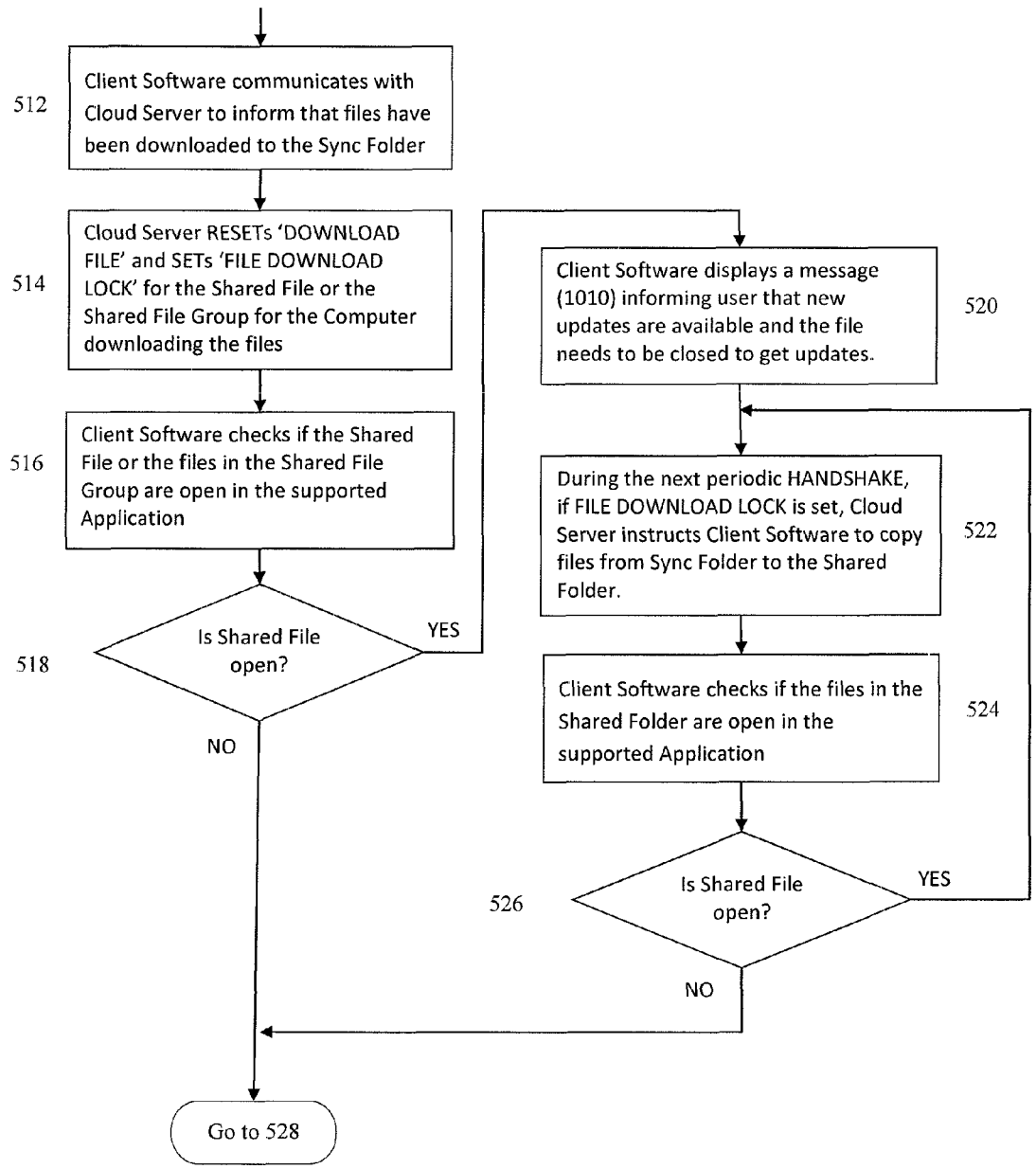
Figure 5C:
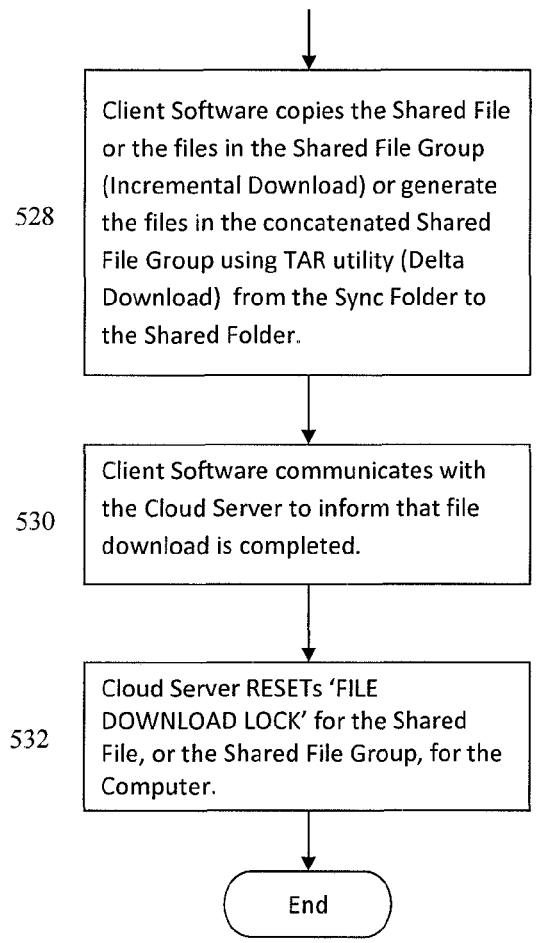

FIG. 5A, FIG. 5B, and FIG. 5C are flow diagrams illustrating a process used to download a new file or changes made to an existing file to other computers sharing the file according to an embodiment.

At 502, when Client Software running on a Computer communicates with the Cloud Server to do the periodic HANDSHAKE, Cloud Server checks if the status of the DOWNLOAD FILE for a Shared File or a Shared File Group in the Shared Folder of the Computer is SET.

At 504, if download is required, at 506 the Cloud Server instructs the Client Software to download the Shared File or the Shared File Group from the Cloud Storage to the Sync Folder. At 504, if download is not required then no action is taken until the next HANDSHAKE.

At 508, Client Software downloads the Shared File or Shared File Group from the Cloud Storage to the Sync Folder using the Incremental Download method or Delta Download method (described below with reference to FIGS. 7A, 7B, 7C, and 7D and FIGS. 9A, 9B, 9C, and 9D) depending on the configuration set for the user.

At 510, when download is completed successfully, Client Software communicates with the Cloud Server at 512, to inform that download of Shared File or the files in the Shared File Group is completed.

At 514 Cloud Server RESETs DOWNLOAD FILE and SETs FILE DOWNLOAD LOCK status for the Shared File or the Shared File Group for the Computer, indicating that files have been downloaded to the Sync Folder.

At 516 Client Software checks if the Shared File or the files of the Shared File Group in the Shared Folder are open by the user in its supported Application. If the files being downloaded are new for the computer, then this check is skipped as the files will not be present in the Shared Folder.

Figure 10B:
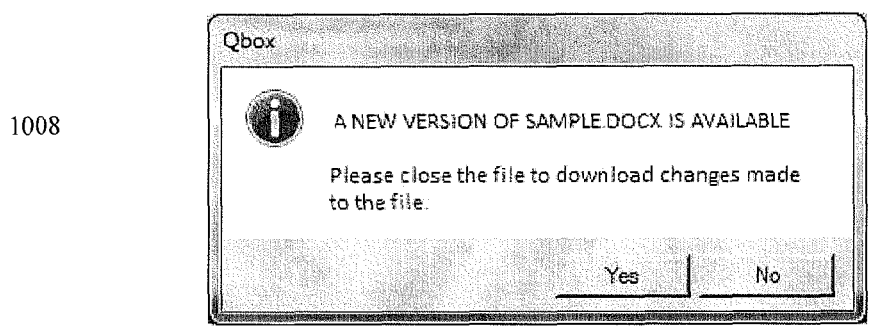

At 518 if the files are open, then at 520 Client Software displays a message (as shown in FIG. 10B at 1008) to inform the user that new updates to the Shared File or Shared File Group are available and the file needs to be closed to get the updates.

On the next periodic HANDSHAKE, at 522, as the FILE DOWNLOAD LOCK status is SET for the files for the Computer, Cloud Server instructs Client Software to copy the files from the Sync Folder to the Shared Folder.

At 524, the Client Software checks if the Shared File or the files in the Shared File Group in the Shared Folder are closed in their supported Application.

At 526, if the files are again open, no action is taken until the next periodic HANDSHAKE, when the Cloud Server again instructs the Client Software to copy the files from the Sync Folder to the Shared Folder. This process continues until the Client Software detects that the files are closed.

When the Client Software detects that the files are closed, or in the case when the files are not present, at 528 Client Software copies the Shared File or the files in the Shared File Group from the Sync Folder to the Shared Folder. In the case of Delta Download method, Client software separates out the files in the concatenated Shared File Group using the TAR utility before copying them to the Shared Folder.

At 530, Client Software communicates with the Cloud Server to inform that files have been downloaded to the Shared Folder successfully.

At 532 Cloud Server RESETs the FILE DOWNLOAD LOCK status for the Shared File or the Shared File Group for the computer downloading the file. This completes the file download operation.

In this manner, Client Software running on all Computers sharing the file download the Shared File or the Shared File Group from the Cloud Storage to the Shared Folder on their respective Computers.

As described above, downloading changes made to the Shared File or files in a Shared File Group, first to the Sync Folder and then copying to the Shared Folder provides users additional flexibility: they can view the Shared File without making changes during the time files are being downloaded to the Sync Folder, then close the file to get the updates quickly. This reduces waiting times as download of changes may take long time if the Internet bandwidth available to the users is limited.

Figure 6A:
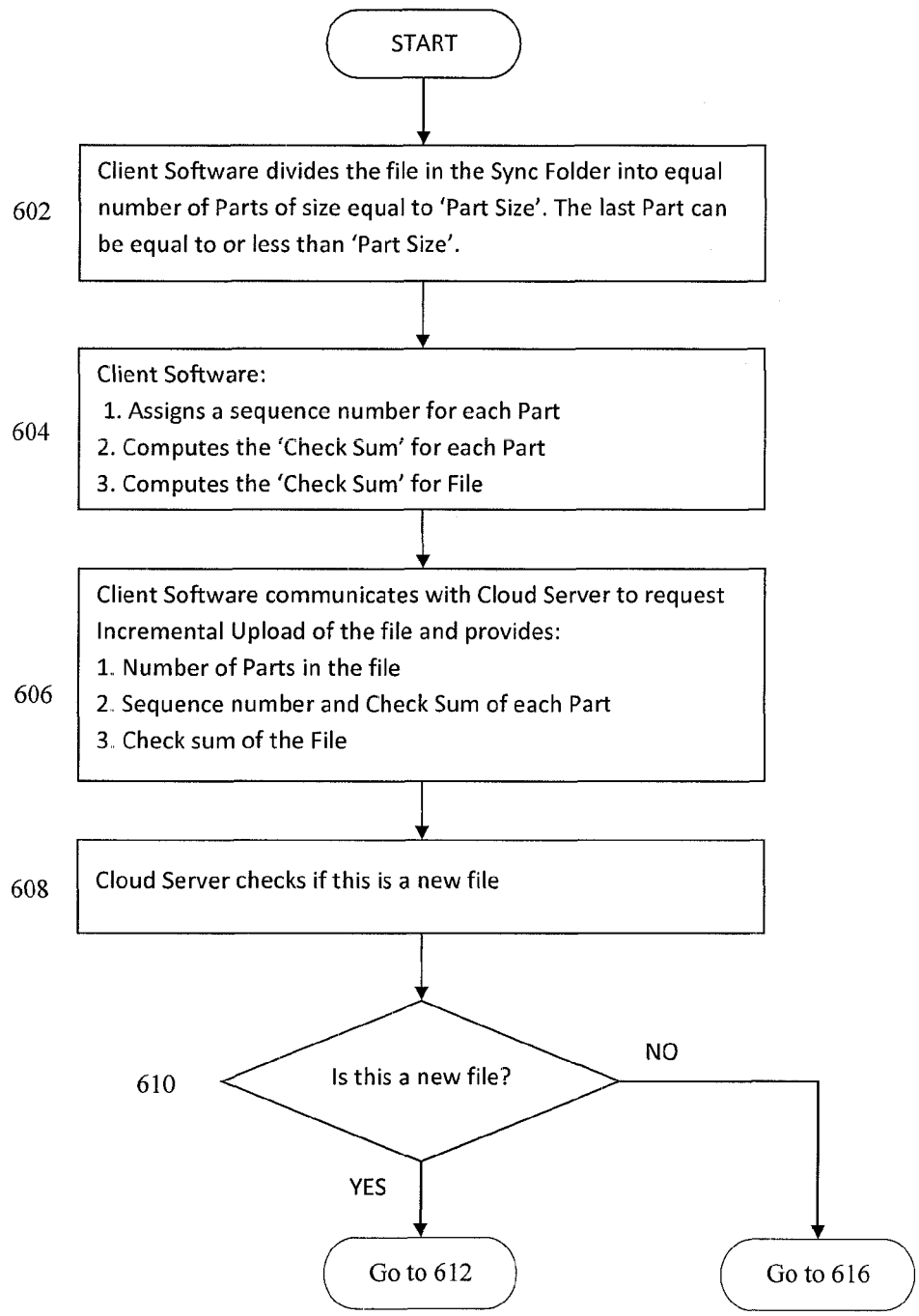
FIG. 6A, FIG. 6B, and FIG. 6C are flow diagrams illustrating an Incremental Upload method according to an embodiment.
Figure 6B:
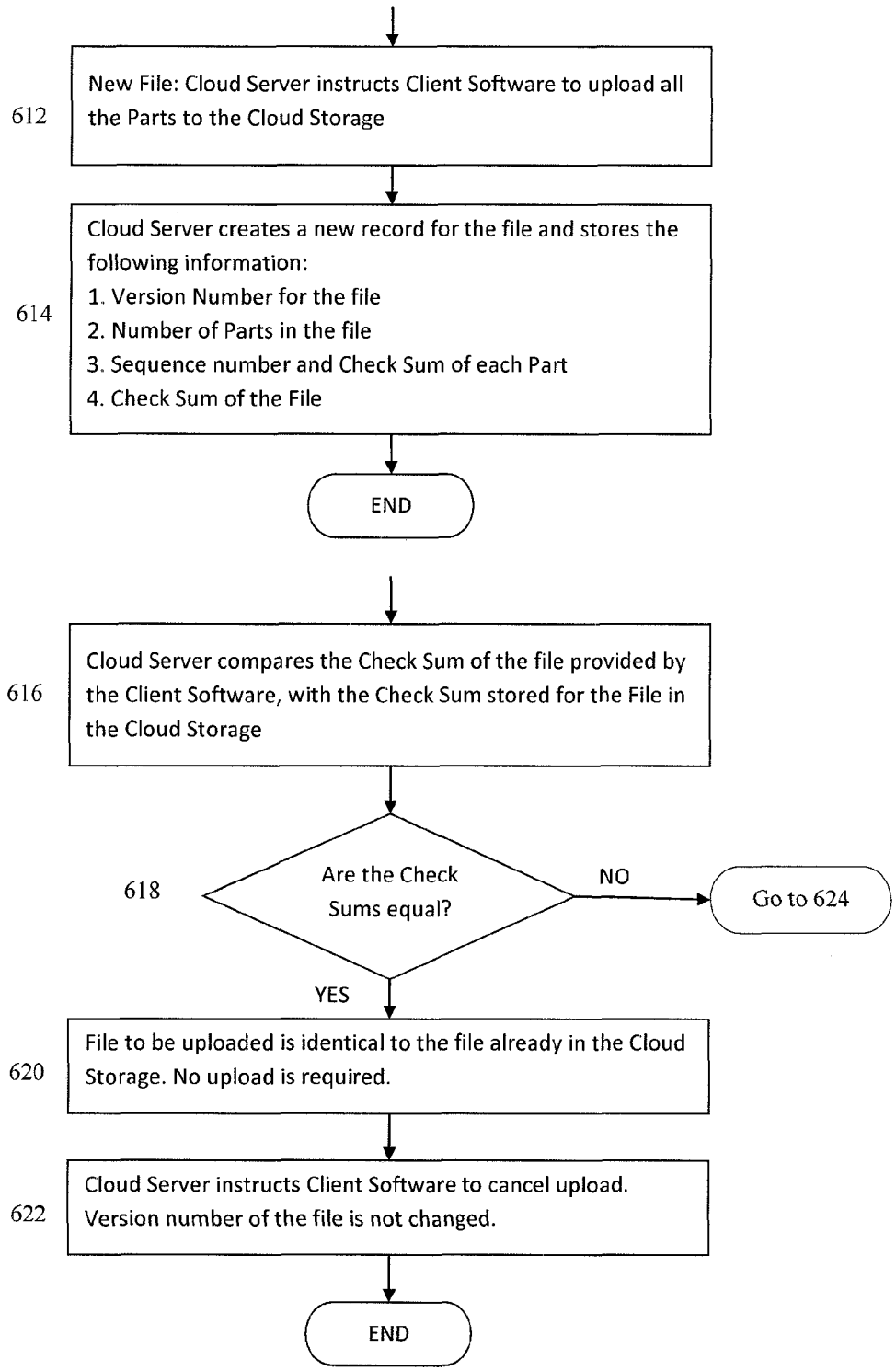
Figure 6C:
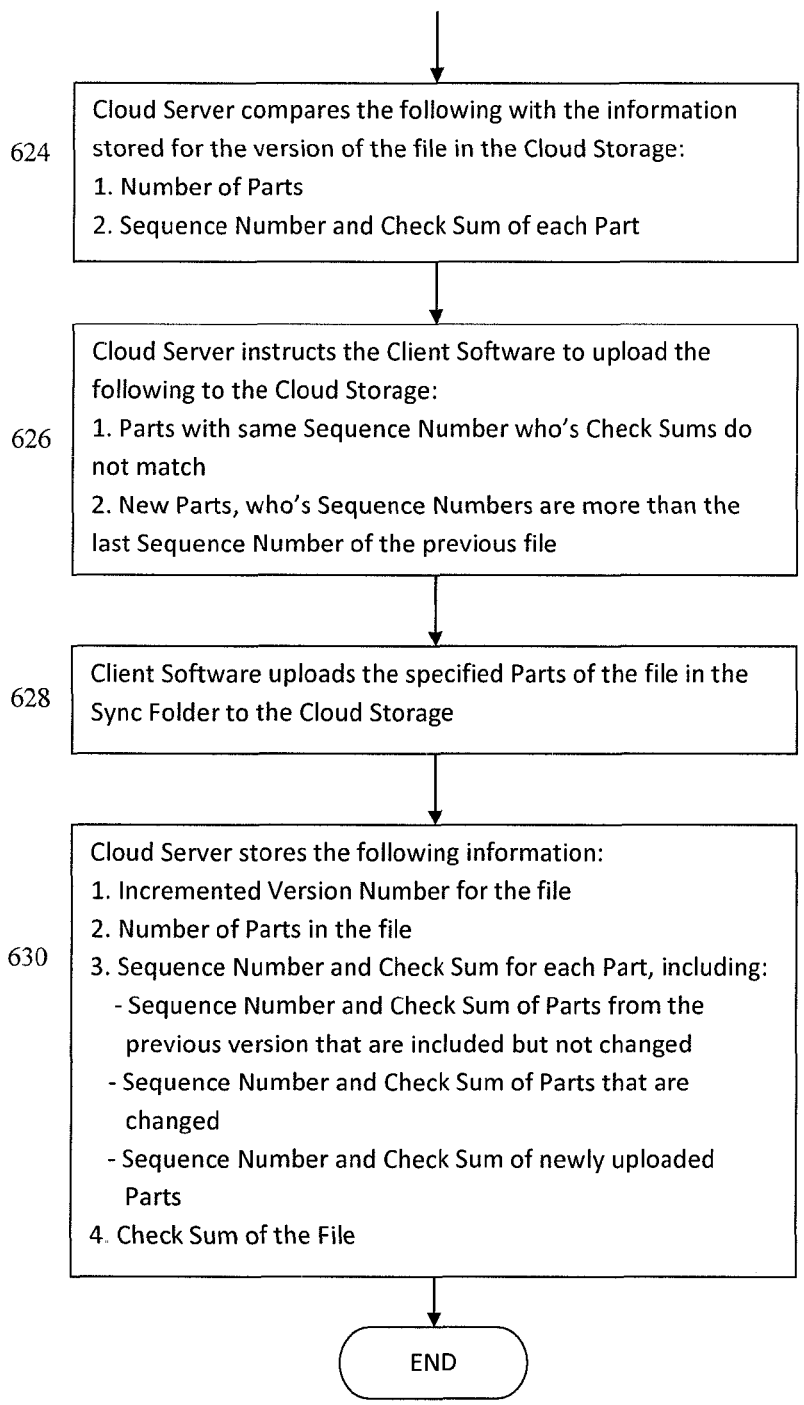
Figure 7A:
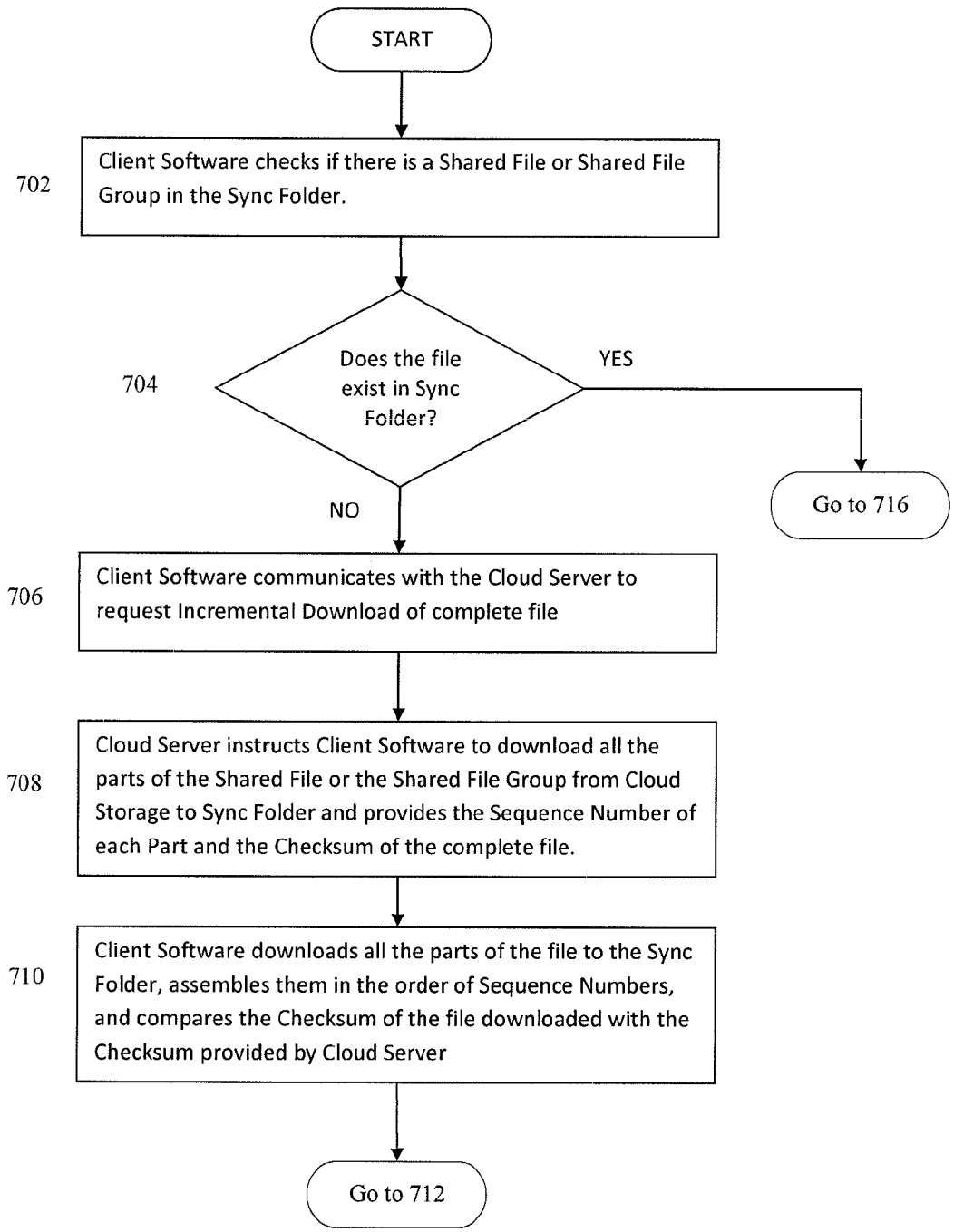
FIG. 7A, FIG. 7B, FIG. 7C, and FIG. 7D are flow diagrams illustrating an Incremental Download method according to an embodiment.
Figure 7B:
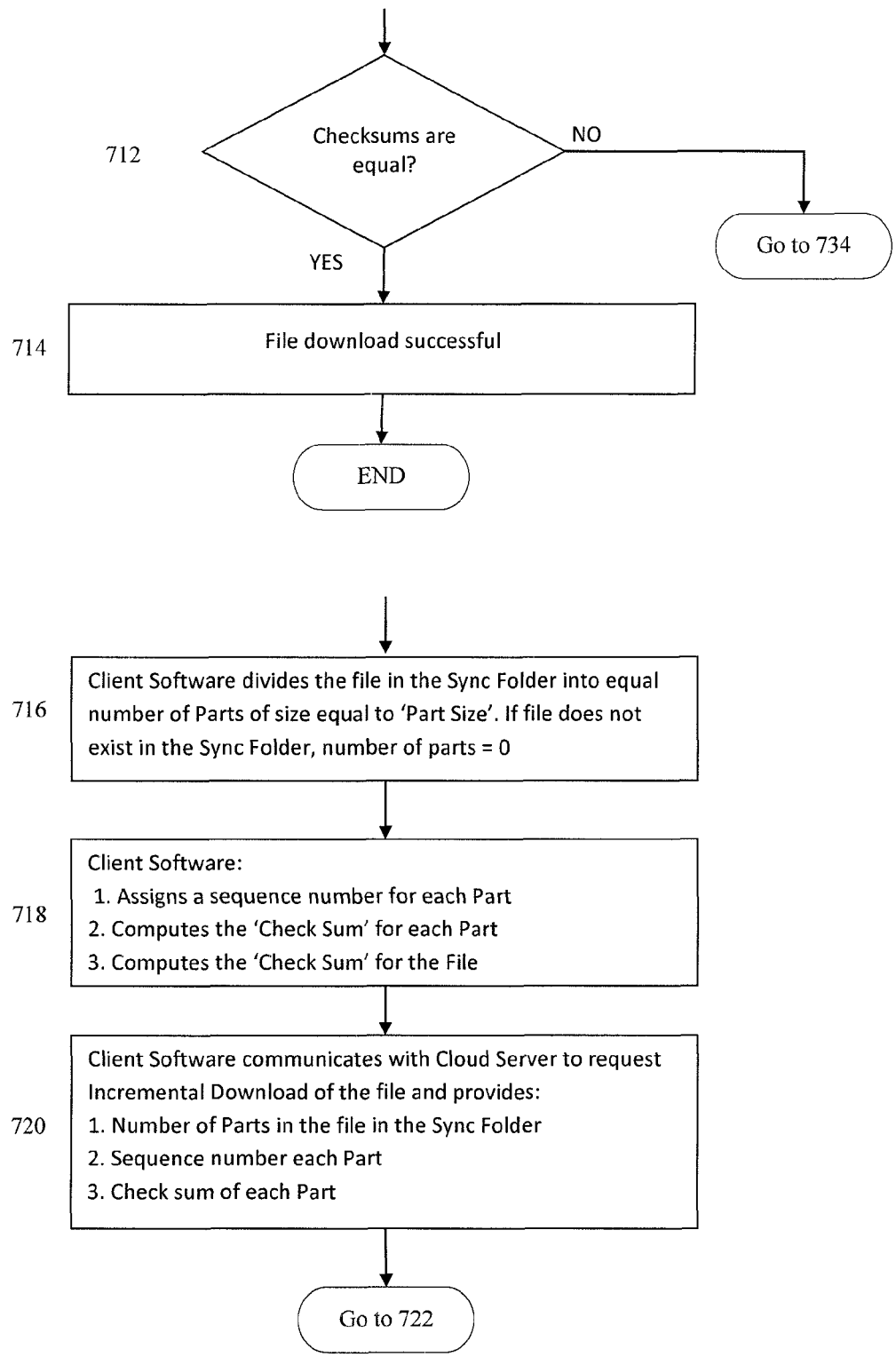
Figure 7C:
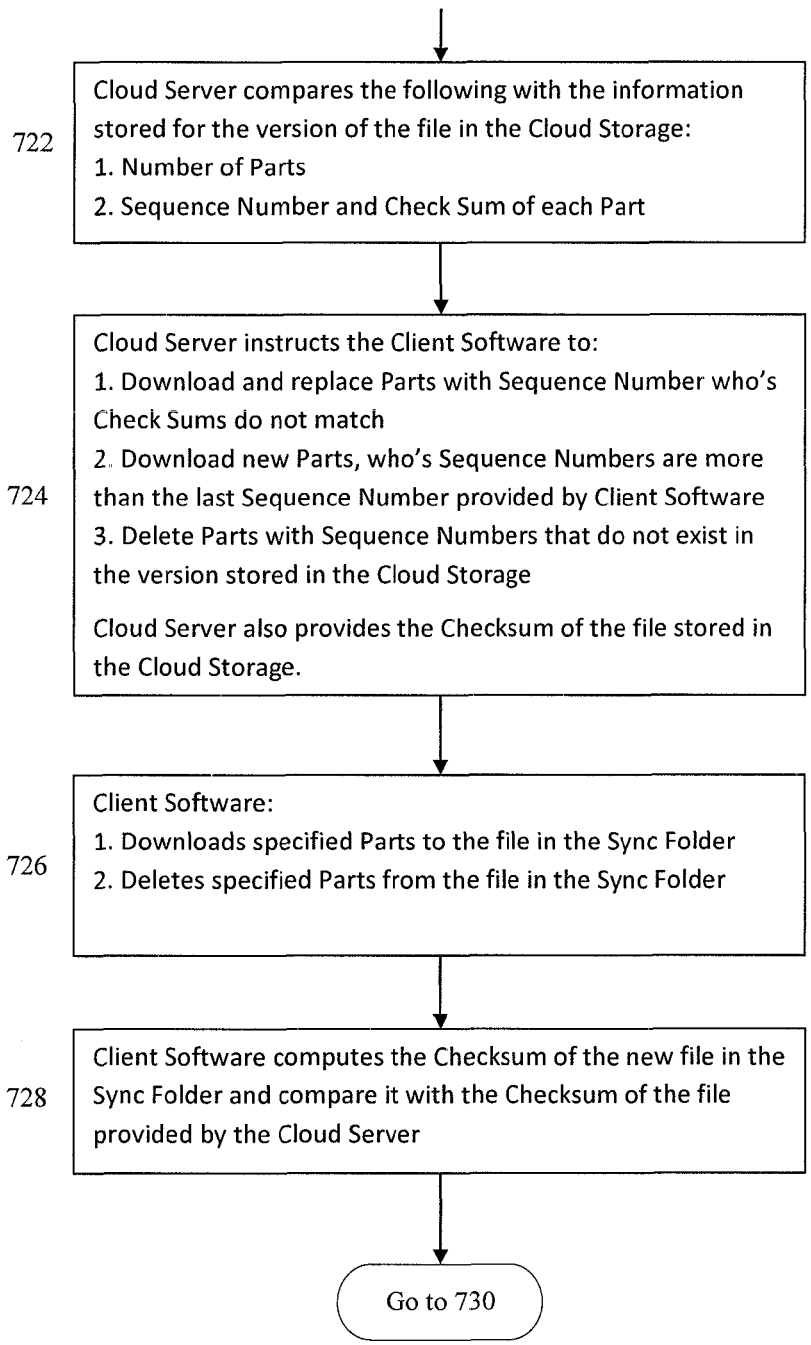
Figure 7D:
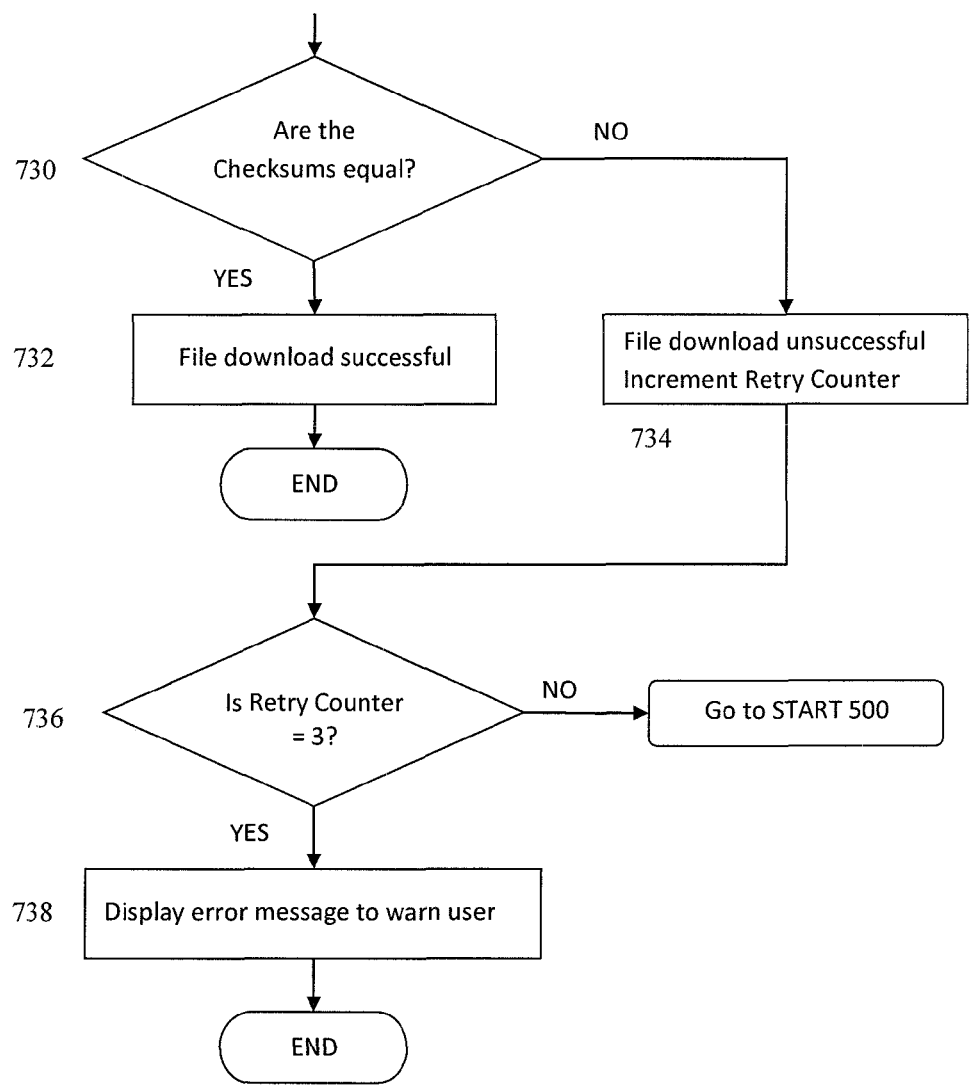
Figure 8A:
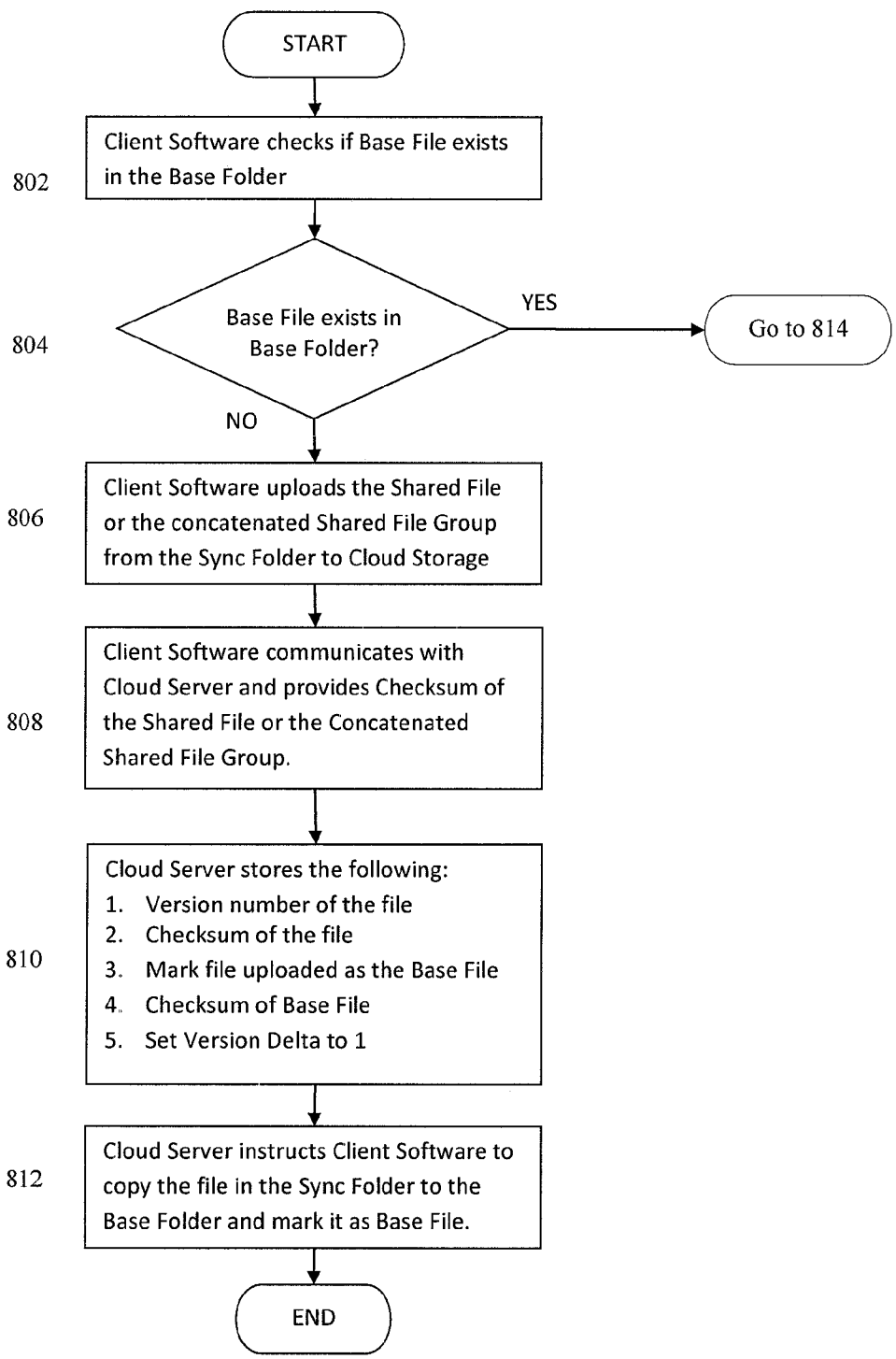
FIG. 8A, FIG. 8B, FIG. 8C, and FIG. 8D are flow diagrams illustrating a Delta Upload method according to an embodiment.
Figure 8B:
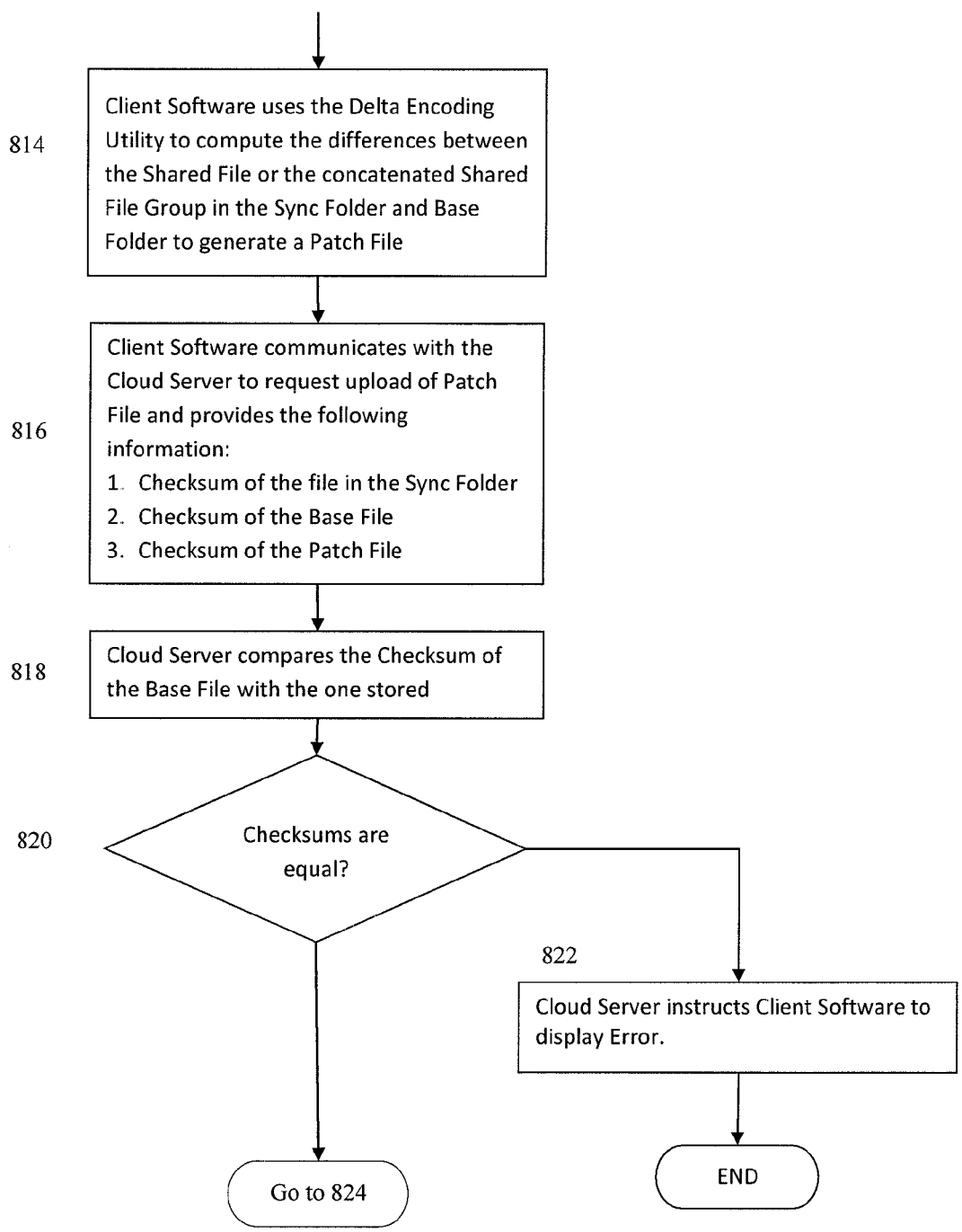
Figure 8C:
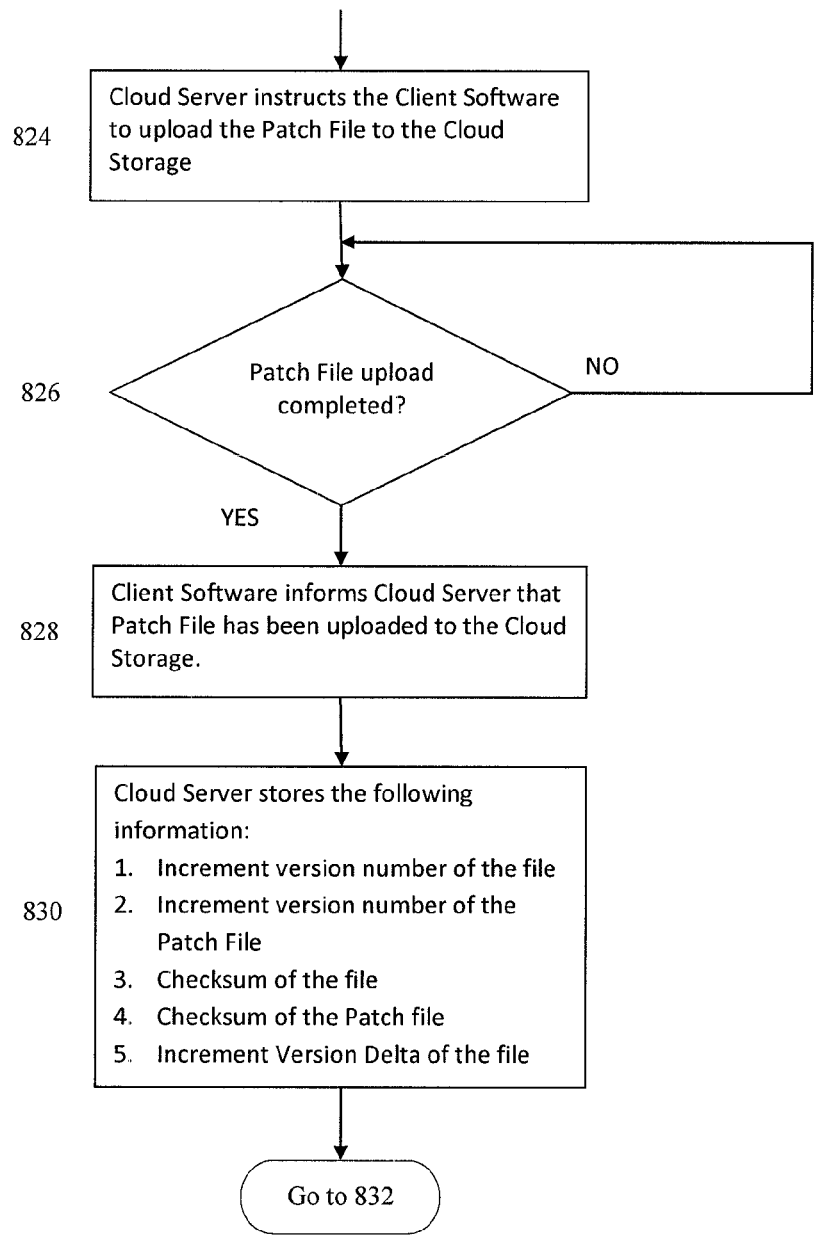
Figure 8D:
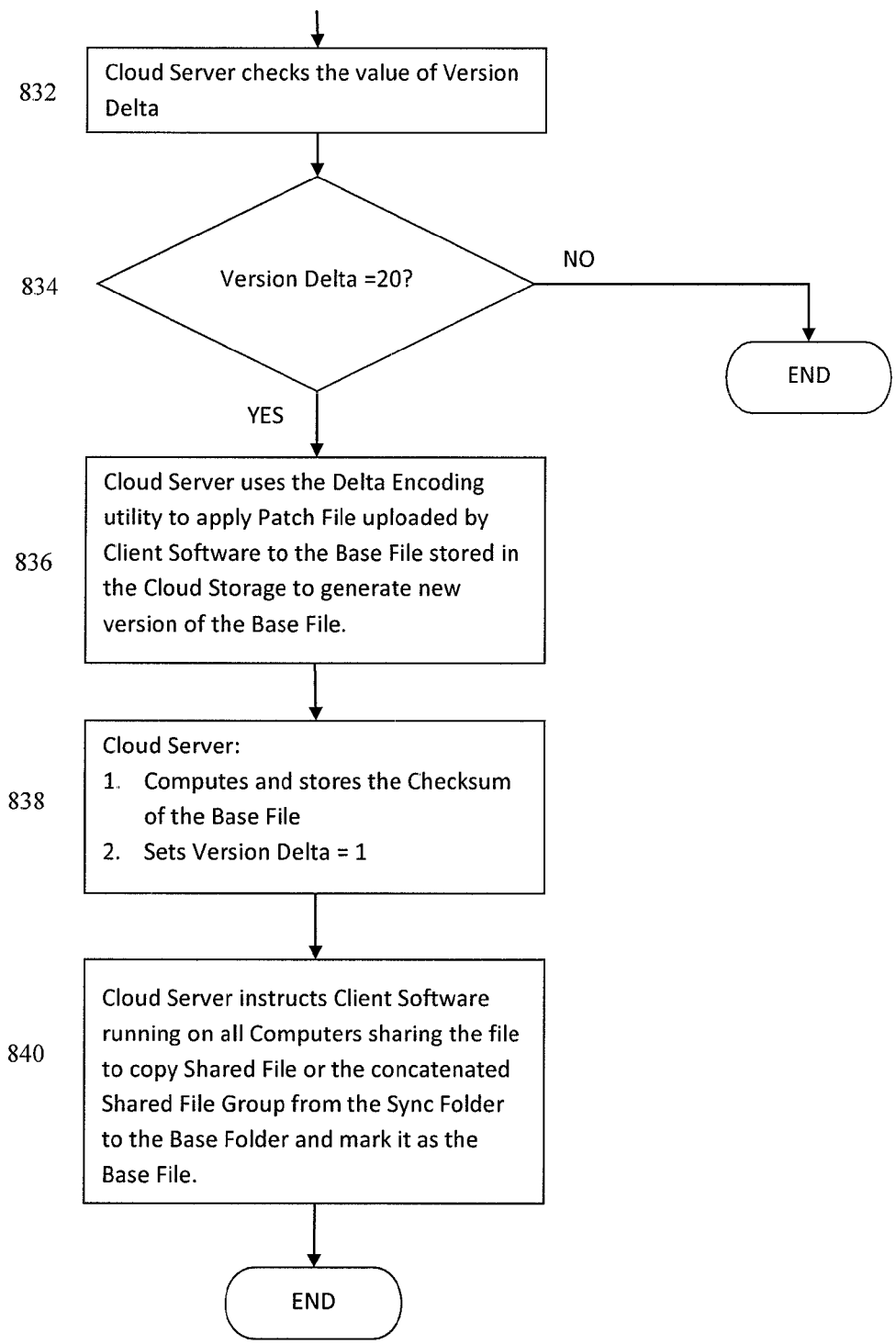
Figure 9A:
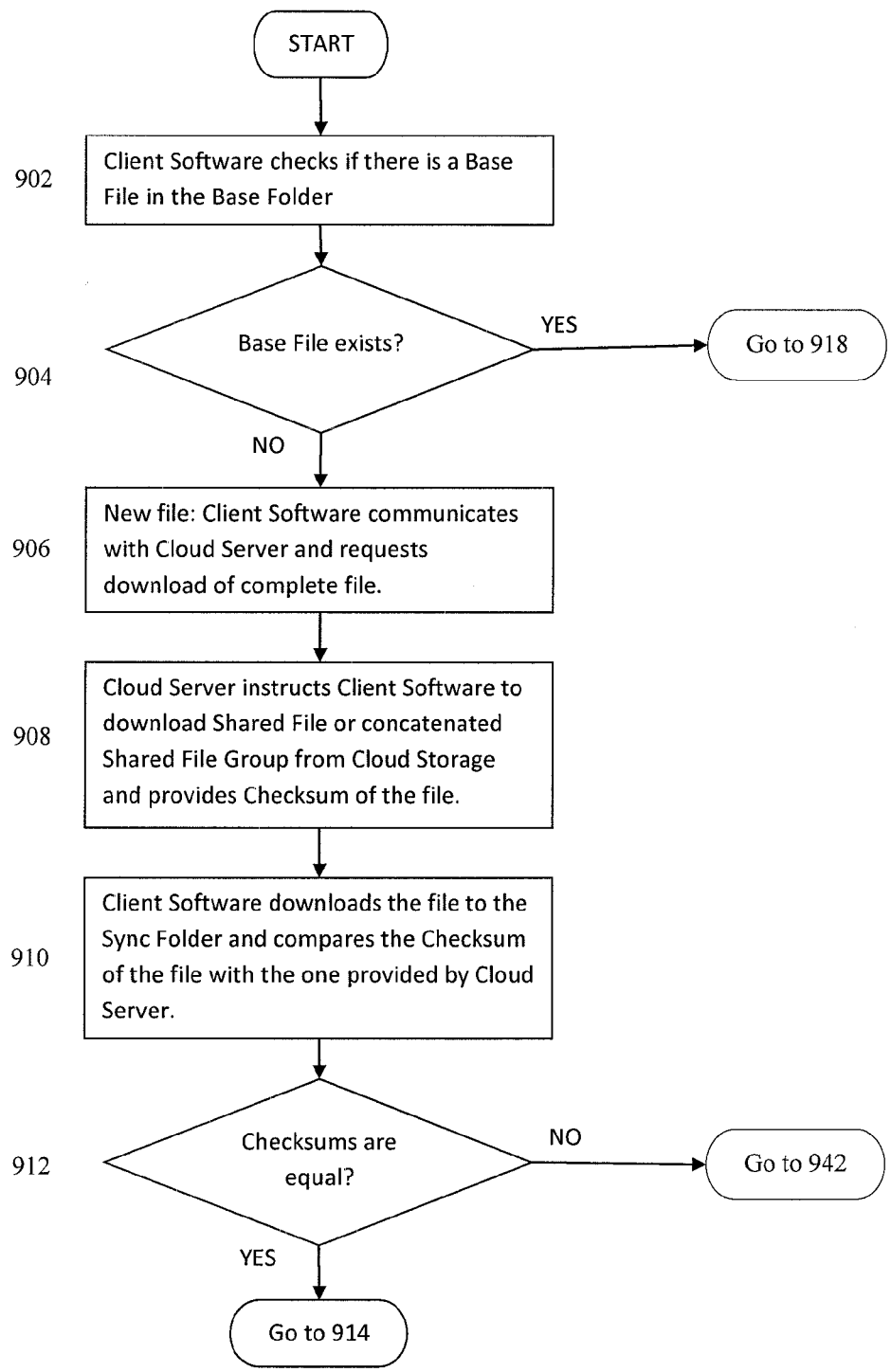
FIG. 9A, FIG. 9B, FIG. 9C, and FIG. 9D are flow diagrams illustrating a Delta Download method according to an embodiment.
Figure 9B:
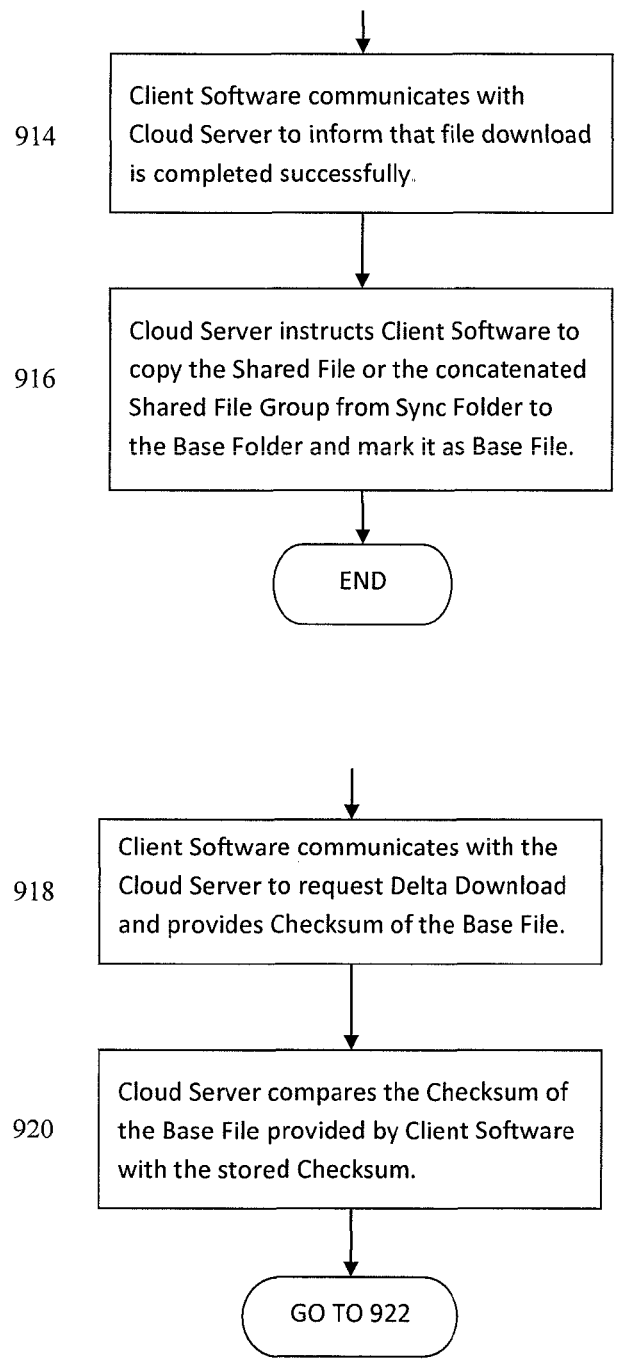
Figure 9C:
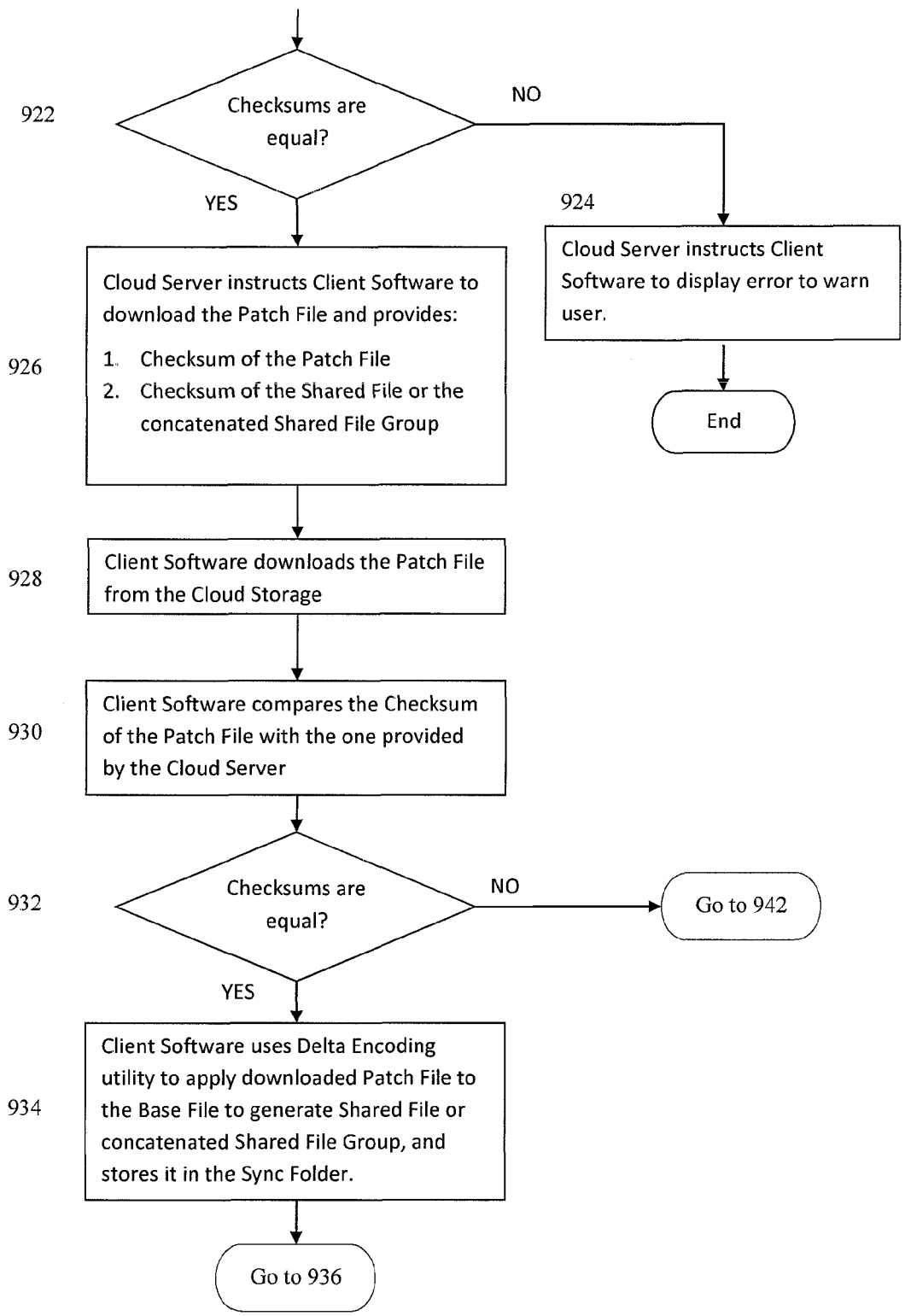
Figure 9D:
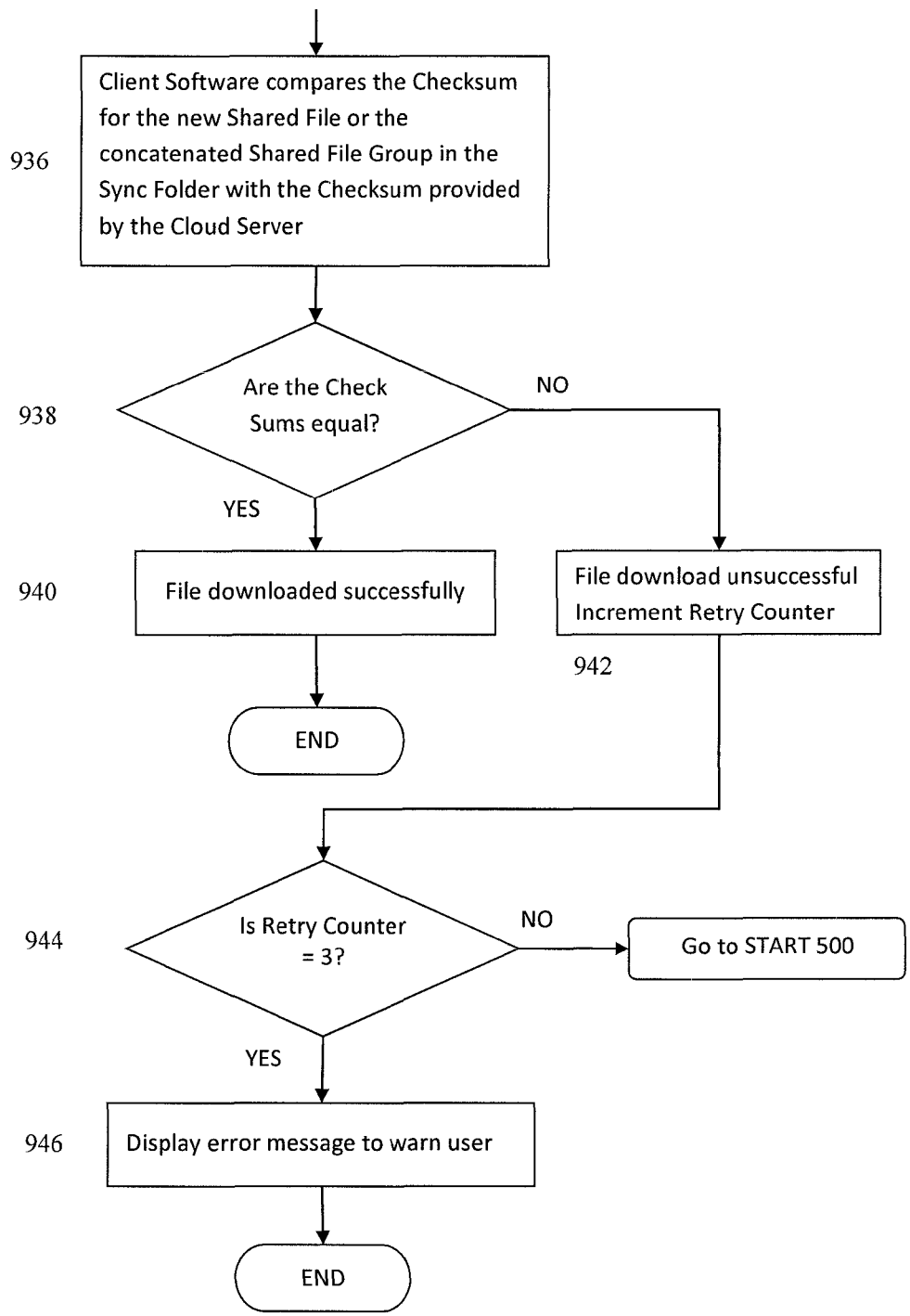

FIG. 6A, FIG. 6B, and FIG. 6C are flow diagrams illustrating an Incremental Upload method 600 according to an embodiment. This process is used for uploading a File or changes made to a file from the Sync Folder to the Cloud Storage using the Incremental Upload method. When changes are made to a file, the Incremental Upload method only uploads the changes, reducing the time taken to upload files and preserving Internet bandwidth used.

For uploading, at 602, Client Software first logically divides the file in the Sync Folder into Parts of size equal to 'Part Size'. Part Size is configurable and is set to one value—as an example: 1 Mega Byte. The last part of the file can be equal to or less than the Part Size.

Next at 604, Client Software assigns sequence numbers and computes the Checksum for each Part. It also computes the Checksum for the entire file.

At 606, Client Software communicates with the Cloud Server to request Incremental Upload of the file, and provides:
1. Number of Parts in the file
2. Sequence number and Checksum of each Part
3. Checksum for the entire file At 608, Cloud Server checks if this is a new file. At 610 if the Cloud Server decides that it is a new file, then at 612, it instructs the Client Software to upload all the Parts to Cloud Storage. Client Software then uploads all the parts to the Cloud Storage.

At 614, Cloud Server stores the Version Number, Number of Parts, Sequence Number and Checksum for each Part and the Checksum for the entire file in its Database.

Upload of a new file is now completed.

If at 608, Cloud Server determines that it is an existing file, at 616 it compares the Checksum of the file provided by Client Software, with the one stored for the previously uploaded file.

At 618, if the Cloud Server finds that the Checksums are equal, the file has not been changed and no upload is required.

At 620 Cloud Server decides that no upload is required and at 622 instructs the Client Software to cancel upload.

At 618, if the Cloud Server finds that Checksums of the files are different, at 624 it compares the number of Parts and Sequence numbers provided by the Client Software with that stored for the previously uploaded file to identify the parts that have changed and the parts that have been added to the file.

At 626 it instructs the Client Software to:
1. Upload Parts whose Checksums are not equal to the Checksums of corresponding Parts of the previously uploaded file
2. Upload Parts whose sequence numbers are more than the last sequence number of the Parts of the previously uploaded file At 628 Client Software uploads the specified parts to the Cloud Storage.

At 630 Cloud Server stores:
1. Number of Parts
2. Checksum for Parts that are uploaded and replaced
3. Sequence number and Checksum of new Parts uploaded
4. Sequence Number and Checksum of Parts from the previous file which are unchanged and included in the new file
5. The Checksum for the file
6. Incremented Version Number for the new file Incremental Upload of the file from Sync Folder to the Cloud Storage is now completed.

FIG. 7A, FIG. 7B, FIG. 7C, and FIG. 7D are flow diagrams illustrating an Incremental Download method 700 according to an embodiment. Method 700 downloads a new file or changes made to a Shared File or Shared File Group from the Cloud Storage to the Sync Folder.

Sync Folder on each Computer contains the previously uploaded or downloaded version of the file to be downloaded. At 702, Client Software checks if the file exists in the Sync Folder.

At 704, if it finds that there is no file, it means that this is a new file and the complete file needs to be downloaded from Cloud Storage.

At 706, Client Software communicates with Cloud Server to request Incremental Download of the complete file from Cloud Storage.

At 708, Cloud Server instructs Client Software to download all the parts of the file and provides the Sequence Number of all the Parts of the file, and the Checksum of the complete file.

At 710, Client Software downloads all the parts and assembles them in the order of Sequence Number to reconstruct the file in the Sync Folder. It then computes the Checksum of the file and compares it with the Checksum provided by the Cloud Server.

At 712, if the Checksums are equal then at 714 Client Software returns Shared File or the files in the Shared File Group have been downloaded successfully.

At 712, if the Checksums are not equal, then at 734 the Client Software increments the Retry Counter to attempt file download 3 times before displaying an error to the user. This part of the flow diagram is described more in detail later in this description.

At 704, if the Client Software finds that a previous version of Shared File or the files in the Shared File Group exist in the Sync Folder, then this is an existing file and the Client Software downloads only the changes made to the file.

At 716, Client Software logically divides the file into Parts of size equal to Part Size and at 718 it assigns Sequence Numbers to each part and computes the Checksum for each Part and the Checksum of the entire file.

Client Software, at 720, communicates with the Could Server and provides the following information to initiate download:
1. Number of Parts in the file
2. Sequence Number and Checksum for each Part
3. Checksum of the file At 722, Cloud Server compares the Number of Parts, Sequence Number and Checksum of parts provided by Client Software with those stored in the Cloud Storage for the Shared File or the files in the Shared File Group, to be downloaded.

At 724 Cloud Server instructs the Client Software to:
1. Download and replace Parts whose Checksums are not equal to the Checksums of corresponding Parts of the file in the Sync Folder
2. Download new Parts, whose sequence numbers are more than the sequence number of the last Part of the file in the Sync Folder
3. Delete Parts of the file in the Sync Folder, which are not present in the file in the Cloud Storage Cloud Server also provides the Checksum for the entire file.

At 726, Client Software downloads the parts specified by the Cloud Server from the Cloud Storage and:
1. Replaces parts of the file, whose sequence numbers are present in the existing file.
2. Adds parts, whose sequence numbers are greater than the last part of the file, to the end of the file. This happens if the file size has increased.
3. Deletes parts at the end of the file, as per instructions received from Cloud Server. This happens if the file size has reduced.

This operation constructs the Shared File or the files in the Shared File Group in the Sync folder and makes them identical to the file in the Sync Folder of the computer that uploaded the file.

To guarantee that the constructed file is identical to the one uploaded, at 728, Client Software computes the Checksum for the file and compares it with the Checksum provided by the Server.

At 730, if the Client Software finds that Checksums are equal, then the file downloaded to the Sync Folder is identical to the file in the Sync Folder of the computer that uploaded the file to the Cloud Storage and at 732, Incremental Download operation is completed.

At 730, if the Checksums are not equal, at 734, Client Software increments the Retry Counter.

At 736, if the Retry Counter is less than 3, Client Software aborts the operation and the download process starts all over again, when the next periodic HAND SHAKE occurs (see FIG. 5A).

At 736, if the Retry Counter has reached 3, Client Software has attempted to download 3 times and at 738 displays an error message to the user warning that files could not be downloaded successfully so user can take the necessary corrective action.

FIG. 8A, FIG. 8B, FIG. 8C, and FIG. 8D are flow diagrams illustrating a Delta Upload method 800 according to an embodiment.

For uploading files using the Delta Upload method, Client Software, at 802, first checks if the Base File exists in the Base Folder.

At 804, if it finds that there is no Base File, then this is the first time the file is being uploaded.

At 806, Client Software uploads the entire Shared File or concatenated Shared File Group from the Sync Folder to the Cloud Storage.

At 808, Client Software communicates with the Cloud Server and provides the Checksum of the Shared File or the concatenated Shared File Group that has been uploaded.

At 810, Cloud Server:
1. Stores the Checksum of the entire file
2. Stores the version number of the file
3. Marks the file uploaded as the Base File
4. Sets the Version Delta of the file 1 as the Base File is same as file uploaded.

At 812, Cloud Server instructs the Client Software to copy the Shared File or the concatenated Shared File Group from the Sync Folder to the Base Folder. Client Software uses this Base File to generate or apply Patch Files.

This completes the upload of a new Shared File or concatenated Shared File Group from Sync Folder to the Cloud Storage.

At 804, if the Client Software finds that there is a Base File in the Base Folder, then a previous version of the file to be uploaded already exists.

At 814, Client Software uses the Delta encoding utility to compute the differences between the Shared File or the concatenated Shared File Group in the Sync Folder and the Base File in the Base Folder to generate a Patch File. The Patch File is stored in the Sync Folder.

At 816, Client Software communicates with the Cloud Server to request upload of the Patch File, and provides:
1. Checksum of the Patch File
2. Checksum of the Shared File
3. Checksum of the Base File At 818, Cloud Server compares the Checksum of the Base File with the one provided by the Client Software.

At 820, if the Checksums of the two Base Files do not match, then the Base File versions between Client and Server are different and the Cloud Server instructs the Client Software to display an error message to warn the user.

At 820, if the Checksums match, then at 824, Cloud Server instructs the Client Software to upload the Patch File to the Cloud Storage.

At 826, once the Patch File is uploaded, at 828 Client Software communicates with Cloud Server to inform that Patch File has been uploaded.

At 830, Cloud Server stores the following information for the file uploaded:
1. Checksum for the Shared File or the concatenated Shared File Group
2. Increment the version number for the Shared File or the concatenated Shared File Group
3. Store the Checksum for the Patch File
4. Increment the version number of the Patch File
5. Increment the Version Delta for the file At 832, Cloud Server checks the value of Version Delta and at 834, if Version Delta is not equal to 20, it means that the difference between the Base File and the uploaded file is less than 20 versions. The upload of files is now completed.

At 834, if Version Delta is equal to 20, which means that difference between the Base File and the uploaded file is equal to 20 versions and 20 Patch Files have been generated from the same Base File. So the Base File needs to be replaced with the current version of the file.

In this case, at 836, the Cloud Server applies the Patch File uploaded by the Client Software to the Base File in the Cloud Storage to generate the Shared File or the concatenated Shared File Group, and stores it in the Cloud Storage. It marks this file as the new Base File.

At 838, Cloud Server computes the Checksum of the new Base File and stores it as the Checksum for the Base File. Cloud Server also sets the value of Version Delta as 1.

At 840, Cloud Server instructs Client Software running on all Computers sharing the file, to copy the Shared File or the concatenated Shared File Group from the Sync Folder to the Base Folder and mark it as the new Base File. After this, the Base File in the Base Folders of these computers and the Base File in the Cloud Storage are identical.

Delta Upload is now complete. The method described above ensures that the Base File used by all Computers to generate Patch File is updated every 20 versions to make sure that the Patch Files do not get too large.

FIG. 9A, FIG. 9B, FIG. 9C, and FIG. 9D are flow diagrams illustrating a Delta Download method 900 according to an embodiment.

To initiate Delta Download, at 902, Client Software first checks if there is a Base File present in the Base Folder.

At 904, if the Base File does not exist, then this is a new file download. At 906, Client Software communicates with Cloud Server to request download of the complete file.

At 908 Cloud Server instructs Client Software to download the Shared File or the concatenated Shared File Group from the Cloud Storage to the Sync Folder, and provides the Checksum for the file to be downloaded.

At 910, Client Software downloads the complete Shared File or the concatenated Shared File Group from Cloud Storage to Sync Folder, and compares the Checksum of the file downloaded with the Checksum provided by the Cloud Server.

At 912, if the Checksums are equal, then at 914, Client Software communicates with Cloud Server to inform that files have been downloaded successfully.

At 916, Cloud Server instructs the Client Software to copy the downloaded file to the Base Folder and mark it as the Base File.

At 912, if the Checksum of the file downloaded is not equal to the Checksum provided by the Cloud Server, then 940 Client Software increments the Retry Counter to attempt the download again, as described later.

At 904, if Client Software finds that there is a Base File present, then a previous version of the file has been downloaded before and at 918, Client Software communicates with the Cloud Server to request Delta Download of the file and provide the Checksum of the Base File.

At 920, Cloud Server compares the Checksum for the Base File provided by the Client Software with the Checksum of the Base File stored in the Cloud Storage.

At 922, if the Checksums are not equal, the Base File versions in the Base Folder is not the same as the one on the Cloud Server, and at 924, Cloud Server instructs Client Software to display an error message warning the user that the files cannot be downloaded.

At 922, if the Checksum of the Base Files are equal, then at 926 Cloud Server instructs the Client Software to download the Patch File and provides:

1. Checksum of the Patch File
2. Checksum of the Shared File or the concatenated Shared File Group At 928, Client Software downloads the Patch File and at 930, compares the Checksum of the downloaded Patch File with the one provided by the Server.

At 932, if the Checksums are not equal, at 942 Client Software increments the Retry Counter and attempts to download the Patch File 3 times as described later in this section.

At 932, if the Checksums are equal, then at 934, Client Software uses the Delta encoding utility to apply the Patch File to the Base File and generate the Shared File or the concatenated Shared File Group, and stores the file in the Sync Folder.

At 936, Client Software computes the Checksum of the Shared File or the concatenated Shared File Group that was generated and compares it with the Checksum provided by the Cloud Server.

At 938, if the Checksums are equal, then at 940, the file generated by the Delta encoding method is identical to the file on the Computer that uploaded the file. The download operation is now completed.

At 938, if the Checksums of the two files are not equal, then the file generated by applying the Patch File to the Base File is not identical to the file in the Cloud Storage.

At 942, Client Software increments the Retry Counter to attempt the download operation 3 times before declaring error.

At 944, the Client Software checks if the Retry Counter has reached a count of 3. If it is not equal to 3, Client Software aborts the download process, and the Delta Download of the files starts all over again, when the Client Software communicates with the Cloud Server to do the next HAND SHAKE.

At 944, if the Retry Counter has reached a count of 3, then the Client Software has attempted to download the file 3 times and at 946, it displays a message to warn the user that download is not successful.

The method and system disclosed herein also includes a file organization software tool and user interface. In an embodiment, the system is referred to herein as Qbox, and the software tool is called Qbox Explorer. In an embodiment, Qbox Explorer runs on the Client Computers to view the folders and files shared on the system at one place. It is also used to configure the features of Qbox Client Software so users can optimize them to suit their operation. Qbox Explorer has the following features according to an embodiment:

1. It displays only the folders and files shared on Qbox, making it convenient for the users to view these folders at one place on their computers
2. File status from both the PC storage as well as from the Cloud Server are displayed for convenient viewing right on the computer. Status includes several information like file size, file upload lock status, file locked by, sync status, etc.
3. Set Qbox configuration
    Qbox Explorer can be used to set Qbox configuration like auto or manual file lock, auto or manual file sync, etc.
4. Perform special Qbox operations
    Qbox Explorer can be used to initiate special Qbox operations like changing the Qbox account, relocate Qbox folder, Ignore changes and release File Upload Lock, etc.

As mentioned before, Qbox Explorer is a versatile tool and dashboard on the computer that helps users to manage all their folders and files right on their computer, without the need for logging into their account on the Qbox website every time.

A description of various embodiments of a method and system for file sharing has been disclosed with reference to the figures. Variations or aspects not explicitly illustrated herein are also within the scope of the invention as claimed. Several of these variations are briefly described below.

Manual Acquisition of File Upload Lock and Release

Based on user preference, the Client Software can be configured to help a user acquire the File Upload Lock manually for the Shared File or the Shared File Group. To do this, the user will select a Shared File and click on a button provided which instructs the Client Software to communicate with the Cloud Server and acquire the File Upload Lock.

After acquiring the File Upload Lock, the user can make changes to the Shared File or the Shared File Group using its supported Application. Once the changes are complete, the user will close the file and initiate upload of changes manually by clicking on a button provided, which instructs the Client Software to communicate with the Cloud Server and initiate the upload of changes made to the Shared File and release the File Upload Lock for the file as described in the document.

Detection of File Open and Closed Conditions

The technology used by the Client Software for monitoring and detecting if a Shared File has been opened by its supported Application can be different from what is described for different Operating Systems and Applications. The Client Software will use a reliable technology recommended for the purpose.

Support for Applications that Use Multiple Data Files

Many of the Applications supported or intended to be supported by the Method and System described in this document create and change multiple files concurrently. In this case, Cloud Server will SET or RESET the File Upload Lock, Upload File, Download File or the File Download Lock, simultaneously for all the files in the Shared File Group during the various operations for acquiring File Upload Lock, upload of changes made to the files to the Cloud Storage and download of changes made to the file from Cloud Storage. Cloud Server will also instruct the Client Software to upload or download changes made to all the files in the Shared File Group simultaneously.

Support for Other Computing Devices

The Method and System described in the document mentions Computer as the device where Shared Files are created and changed. The process and technology described will be used on other types of devices including Desktop, Laptop and Notebook computers, and any of the Handheld or Smartphone types of devices where the Shared Files can be created and processed by its supported application.

Embodiments of the invention include, without limitation, the following aspects and capabilities.

Updates to Shared Files resident on multiple Computers are made coherently by using a Cloud Server on the Internet to permit upload of changes made from only one Computer at a time by issuing and managing File Upload Lock.

Updates to multiple files in Shared File Groups resident on multiple Computers are made coherently by using a Cloud Server on the Internet to permit upload of changes made to all the files in the Shared File Group from only one Computer at a time by simultaneously issuing and managing File Upload Locks for the Shared File Group.

Shared File Groups can be configured to include only those files required by Applications for sharing among multiple Computers. Files specific to a Computer or temporary files created by the Application on a Computer are not included in the Shared File Groups and will not be shared with other Computers to preserver storage space and Internet bandwidth.

A user is prompted to acquire the File Upload Lock when the Shared File or Shared File Group is opened in its supported Application. This enables users to initiate acquisition of the File Upload Lock using an operation that they are familiar with, without the need for performing any special tasks.

Upload of changes made to a file to the Cloud Storage are initiated when the Shared File or Shared File Group is closed by the user in its supported Application. This helps users to initiate upload of changes using an operation that they are familiar with, without the need for performing any special tasks.

When changes made to a Shared File or Shared File Group are downloaded from the Cloud Storage to a Computer, the user is prompted to close the file if it is currently open in its supported Application.

Shared File or all the files in a Shared File Group are first copied to a Sync Folder before they are uploaded over the Internet to the Cloud Storage. This provides users flexibility to open, acquire File Upload Lock and start making changes to the files while the previous changes to the files are being uploaded. This helps reduce waiting time considerably, particularly when Internet speed available to the user is limited.

Shared File or all the files in a Shared File Group are first downloaded to the Sync Folder and then copied to the Shared Folder. This provides users flexibility to open and view the files in its supported Application while changes made to the file by another user are being downloaded from the Cloud Storage. This helps reduce waiting time considerably, particularly when Internet speed available to the user is limited.

'Incremental Upload' method is used to upload only the changes made to a file. This reduces the amount of data and the time taken to upload files.

'Incremental Download' method is used to download only the changes made to a file. This reduces the amount of data and the time taken download files.

'Delta Upload' method that only uploads Patch Files containing the differences between a previous version and current version of the File, and limits the number of version differences to make sure that Patch Files do not get too big.

'Delta Download' method that only downloads Patch Files containing differences between a previous version and current version of the File, and limits the number of version differences to match the Delta Upload method.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A computer implemented method for electronic file sharing, the method comprising:
    a server executing an electronic file sharing process for providing a plurality of users access to a plurality of electronic files via the Internet;
    at least one processor executing a client software process for electronic file sharing on a user device, wherein the client software process communicates with the server via the Internet, and wherein the process comprises monitoring user electronic files to determine whether the user has setup a new shared file;
    if the user has setup a new shared file, the client software process requesting a file upload lock for the new shared file; and
    the server issuing the file upload lock when the server determines that conditions are met, the conditions comprising the file upload lock is not currently issued to another user that has previously setup the same shared file.

2. The method of claim 1, wherein the conditions further comprise:
    an upload file lock is not set;
    a download file lock is not set; and
    a file download lock is not set.

3. The method of claim 1, further comprising:
    a client software process for electronic file sharing on a user device monitoring user electronic files to determine whether the user has opened a shared file on the user device, wherein opening comprises executing a software application adapted to open and modify the shared file;
    when the shared file is opened, the client software process displaying a message to ask the user whether the user wants to acquire a file upload lock in order to be enabled to modify the shared file;
    the client software process receiving input from the user requesting the file upload lock for the shared file;
    the client software process communicating with the server to request the file upload lock for the shared file;
    the server determining if conditions are met to issue the file upload lock for the shared file, the conditions comprising,
    the file upload lock is not set;
    an upload file flag is not set;
    a download file flag is not set; and
    a file download lock is not set.

4. The method of claim 3, further comprising:
    the server and the client software process periodically performing a handshake comprising communicating to determine whether any shared files might be modified since a previous handshake;
    during the handshake, determining whether the file upload lock is set;
    if the file upload lock is set, the server instructing the client software process to initiate an upload shared file process;
    the client software process determining whether the shared file is closed by the application;
    if the file is closed, the client software process making a copy of the shared file;
    the client software process copying the shared file from a shared folder to a sync folder;

during the handshake, determining whether a download file flag is set for the shared file; and if the download file flag is set, the server instructing the client software process to download the shared file from the cloud storage area to a sync folder.

5. The method of claim 4, further comprising:
the client software process communicating with the server to request upload of the shared file from the sync folder;
the server resetting the file upload lock and setting an upload file flag for the shared file;
the server instructing the client software process to upload the shared file to a cloud storage area via the Internet; and
the server resetting the upload file flag for the shared file and setting a download file flag for the shared file.

6. The method of claim 5, wherein uploading the shared file to the cloud storage area comprises an incremental upload process comprising:
the client software process dividing the shared file in the sync folder into a plurality of parts of a predetermined size;
the client software process computing a checksum for each of the parts;
the client software process computing a checksum for the shared file;
the client software process requesting an incremental upload of the shared file from the server;
the server determining if the shared file is a new file;
if the shared file is a new file, the server instructing the client software process to upload all of the parts to the cloud storage area;
the server creating a new record for the shared file; and
the server storing data related to the file comprising a version number, a number of parts, a sequence number, the checksum for each part and the checksum for the shared file.

7. The method of claim 6 wherein the incremental upload process further comprises:
if the shared file is not a new file, the server comparing the checksum for the file communicated by the client software process and a stored checksum;
if the two checksums are equal, the server cancelling the file upload; and
if the two checksums are not equal, the server comparing data for a stored version of the shared file with similar data for the shared file to be uploaded, the data comprising the number of parts and the checksum for each part.

8. The method of claim 7, wherein the incremental upload process further comprises:
the server instructing the client software process to upload to the cloud storage area,
parts with a same sequence number and checksums that do not match stored checksums; and
parts with sequence numbers that are greater than the last stored sequence number for the stored version of the shared file.

9. The method of claim 6, wherein the uploading the shared file to cloud storage area comprises a delta upload process comprising:
the client software process determining whether a base file exists in a base file folder;
if the base file does not exist in the base file folder, the clients software process uploading the shared file from the sync folder to the cloud storage area;
the server storing data related to the shared file uploaded;
the server instructing the client software process to copy the shared file in the sync folder to the base folder and marks the shared file as a base file; and
if the base file does exist in the base folder, the client software process using the delta encoding utility to compute the differences between the shared file in the sync folder and the base file in the base folder to generate a patch file.

10. The method of claim 4, wherein downloading the shared file comprises an incremental download process comprising:
the client software process determining whether the shared file exists in the sync folder;
if the shared file exists in the sync folder, the client software process dividing the shared file into a plurality of parts of a predetermined size;
the client software process assigning a sequence number to each part;
the client software process computing a checksum for each part; and
the client software process computing a checksum for the shared file.

11. The method of claim 10, wherein the incremental download process further comprises:
the client software process communicating with the server to request an incremental download of the file, wherein the client software process provides the server a number of parts in the shared file, the sequence number of each part, and the checksum of each part; and
the server instructing the client software process to download and replace parts whose checksums do not match the checksums of parts with the same sequence number stored in the cloud storage area;
the server instructing the client software process to download new parts whose sequence numbers are greater than a greatest sequence number provided by the client software process; and
the server instructing the client software process to delete parts with sequence numbers that do not exist in the cloud storage area.

12. The method of claim 11, wherein the incremental download process further comprises:
the client software process computing the checksum of the shared file in the sync folder;
the client software process comparing the computed checksum to the checksum of the shared file provided by the server; and
if the checksums are not equal, the client software process retrying the incremental download process.

13. The method of claim 4, wherein downloading the shared file comprises a delta download process comprising:
the client software process determining whether there is a base file in a base folder;
if there is no base file in the base folder, the client software process requesting download of a complete new shared file from the server;
the server instructing the client software process to download the new shared file from the cloud storage area and providing a checksum of the new shared file;
the client software process downloading the new shared file to the sync folder;
the client software process comparing the checksum of the new shared file with the checksum from the server;
if the checksums are equal, the client software process communicating to the server that the download was successful;

the server instructing the client software process to mark the new shared file as a base file; and the server instructing the client software process to copy the new shared file from the sync folder to the base folder.

14. The method of claim 4, wherein the delta download process further comprises:

if there is a base file in the base file folder, the client software process communicating with the server to request a delta download;

the client software process communicating with the server to provide a checksum of a base file to the server;

the server comparing the provided checksum with a checksum of a base file stored in the cloud storage area;

if the checksums are not equal, the server instructing the client software process to display an error message to the user;

if the checksums are equal, the server instructing the client software process to download a patch file;

the server providing the client software process a checksum of the patch file, and a checksum of the shared file;

the client software process comparing the checksums of the patch file;

if the checksums are equal, the client software process applying the patch file to the base file to generate the shared file;

the client software process comparing the checksum of the generated shared file with the checksum provided by the server; and if the checksums are not equal, the client software process retrying the delta download process a predetermined number of times.

15. A non-transient computer readable medium having instruction stored thereon, that when executed in one or more processors cause the one or more processors to perform a file sharing method, the method comprising:

a server processor executing an electronic file sharing process for providing a plurality of users access to a plurality of electronic files via the Internet;

at least one processor executing a client software process for electronic file sharing on a user device, wherein the client software process communicates with the server via the Internet, and wherein the process comprises monitoring user electronic files to determine whether the user has setup a new shared file;

if the user has setup a new shared file, the client software process requesting a file upload lock for the new shared file; and the server processor issuing the file upload lock when the server determines that conditions are met, the conditions comprising the file upload lock is not currently issued to another user that has previously setup the same shared file.

16. The medium of claim 15, wherein the conditions further comprise:

an upload file condition does not exist;
a download file condition does not exist; and
a file download lock is not set.

17. The medium of claim 15, wherein the file sharing method further comprises:

a client software process for electronic file sharing on a user device monitoring user electronic files to determine whether the user has opened a shared file on the user device, wherein opening comprises executing a software application adapted to open and modify the shared file;

when the shared file is opened, the client software process displaying a message to ask the user whether the user wants to acquire a file upload lock in order to be enabled to modify the shared file;

the client software process receiving input from the user requesting the file upload lock for the shared file; and the client software process communicating with the server to request the file upload lock for the shared file.

18. The medium of claim 17, wherein the file sharing method further comprises:

the server processor determining if conditions are met to issue the file upload lock for the shared file, the conditions comprising, the file upload lock is not set;
an upload file condition does not exist;
a download file condition does not exist; and
a file download lock is not set.

19. The medium of claim 18, wherein the file sharing method further comprises:

the server processor setting the file upload lock for the shared file; and the server processor through the client software process informing the user that the file upload lock has been issued and the user can modify the shared file.

20. The medium of claim 18, wherein the file sharing method further comprises:

the client software process receiving input from the user declining the file upload lock for the shared file; and the client software process displaying a message to the user to confirm that changes made to the file by the user will not be saved.

21. The medium of claim 19, wherein the file sharing method further comprises:

the server processor and the client software process periodically performing a handshake comprising communicating to determine whether any shared files might be modified since a previous handshake;

during the handshake, determining whether the file upload lock is set; and if the file upload lock is set, the server processor instructing the client software process to initiate an upload shared file process.

22. The medium of claim 21, wherein the file sharing method further comprises:

the client software process determining whether the shared file is closed by the application; and if the file is closed, the client software process making a copy of the shared file.

23. The medium of claim 22, wherein making a copy of the shared file comprises copying the shared file from a shared folder to a sync folder.

* * * * *